US008869230B2

(12) United States Patent
Lee et al.

(10) Patent No.: US 8,869,230 B2
(45) Date of Patent: Oct. 21, 2014

(54) MOBILE TERMINAL AND COUPON MANAGING METHOD THEREOF

(75) Inventors: Wonjong Lee, Gwangmyeong-si (KR); Hyunho Koh, Seoul (KR); Miseon Kim, Seoul (KR); Euisoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 328 days.

(21) Appl. No.: 13/336,778

(22) Filed: Dec. 23, 2011

(65) Prior Publication Data

US 2012/0260275 A1 Oct. 11, 2012

(30) Foreign Application Priority Data

Apr. 11, 2011 (KR) ........................ 10-2011-0033255

(51) Int. Cl.
*H04N 7/16* (2011.01)

(52) U.S. Cl.
USPC .............................. 725/135; 725/62; 725/136

(58) Field of Classification Search
USPC ............... 725/23, 32, 62, 135–136; 705/14.1, 705/14.22, 14.35; 348/729
See application file for complete search history.

(56) References Cited

U.S. PATENT DOCUMENTS 5,287,181 A * 2/1994 Holman ........................ 348/473
2006/0156356 A1* 7/2006 Sato et al. ....................... 725/89
2008/0244635 A1 10/2008 Pollard et al.
2009/0138904 A1 5/2009 Kitsukawa et al.
2010/0031284 A1* 2/2010 Miyaki .......................... 725/32

FOREIGN PATENT DOCUMENTS

| | | |
|---|---|---|
| CN | 101753712 | 6/2010 |
| EP | 0833511 | 4/1998 |
| EP | 1207700 | 5/2002 |
| EP | 1748589 | 1/2007 |
| EP | 2192708 | 6/2010 |
| KR | 10-2009-0074570 | 7/2009 |
| WO | 00/38421 | 6/2000 |

OTHER PUBLICATIONS

European Patent Office Application Serial Appl. No. 12000243.1, Office Action dated Sep. 12, 2013, 6 pages.

* cited by examiner

*Primary Examiner* — Ngoc Vu
(74) *Attorney, Agent, or Firm* — Lee, Hong, Degerman, Kang & Waimey

(57) ABSTRACT

A mobile terminal and coupon managing method thereof are disclosed, by which coupon information may be received using broadcast related information and by which a specific coupon may be received using the received coupon information. The present invention includes receiving broadcast related information, extracting at least one coupon information from the received broadcast related information, displaying the extracted at least one coupon information, and receiving a coupon corresponding to a selected coupon information if the coupon information is selected from the displayed at least one coupon information.

12 Claims, 33 Drawing Sheets network type : 0x00 network type : 0x00 network type : 0x01

FIG. 5A

| Coupon Service List |
| --- |
| 24-3 LGE Coupon Service |
| 25-3 GS Coupon Service<br><br>30-4 SamSung Coupon Service |
| |
| |

FIG. 5B

511

| coupon name | | reception hour | downloadable term | status |
|---|---|---|---|---|
| | LGE Pasta Free | 2:00 pm | 1/7<br>03:00 pm | done |
| HARRIS | Harris Free Shipping | 2:00 pm | 1/8<br>10:00 am | loading |
| | RoundBox Americano Free | 3:00 pm | 1/8<br>11:00 am | loading |
| zenith | Zenith Size Upgrade | 3:00 pm | 1/8<br>02:00 pm | loading |

512 513 514 515 516

| Coupon name | Reception hour | Term | Status |
|---|---|---|---|
| A coffee | – | 11. 04. 01 ~ 11. 04. 10 | Download |
| B hair | – | 11. 04. 03 ~ 11. 04. 05 | Download |
| C shopping | – | 11. 04. 01 ~ 11. 04. 30 | Download |
| D travel | – | 11. 04. 01 ~ 11. 06. 01 | Download |

810

(a)

| Coupon name | Reception hour | Term | Status |
|---|---|---|---|
| A coffee | 11. 04. 10 AM 10:00 | 11. 04. 01 ~ 11. 04. 10 | View |
| B hair | – | 11. 04. 03 ~ 11. 04. 05 | |
| C shopping | – | 11. 04. 01 ~ 11. 04. 30 | Download |
| D travel | – | 11. 04. 01 ~ 11. 06. 01 | Download |

810

(b)

810

| Coupon name | Reception hour | Term | Status |
|---|---|---|---|
| E hair | – | 11. 04. 01 ~ 11. 04. 10 | Download |
| F travel | – | 11. 03. 10 ~ 11. 04. 10 | Download |
| G shopping | – | 11. 04. 20 ~ 11. 04. 30 | Download |

(a)

| Coupon name | Reception hour | Term | Status |
|---|---|---|---|
| C coffee | – | 11. 04. 01 ~ 11. 04. 10 | Download |
| B travel | – | 11. 03. 10 ~ 11. 04. 10 | Download |
| D restaurant | – | 11. 04. 20 ~ 11. 04. 30 | Download |

810

(b)

| Coupon name | Reception hour | Term | Status |
|---|---|---|---|
| Baseball A | – | 11. 04. 01 ~ 11. 04. 30 | Download |
| Baseball B | – | 11. 03. 15 ~ 11. 04. 15 | Download |
| Baseball C | – | 11. 04. 10 ~ 11. 04. 20 | Download |
| Baseball D | – | 11. 04. 30 ~ 11. 05. 20 | Download |

FIG. 9C

| Coupon information list | | | |
|---|---|---|---|
| My location | Gangnam Station XX building | | |
| | | | |
| Coupon A | 11. 04. 01 ~ 11. 04. 20 | 1 Km | Download |
| Coupon B | 11. 03. 20 ~ 11. 04. 10 | 1.5 Km | Download |
| Coupon C | 11. 04. 10 ~ 11. 05. 10 | 2 Km | Download |
| Coupon D | 11. 04. 20 ~ 11. 05. 20 | 3 Km | Download |

FIG. 10B

| Coupon information list (current date 11. 04. 11) | | | | |
|---|---|---|---|---|
| Coupon name | Reception hour | Term | Status | |
| A coffee | 11. 04. 01 PM 1:00 | 11. 04. 01 ~ 11. 04. 10 | View | |
| B coffee | – | 11. 04. 05 ~ 11. 04. 15 | Download | 1004 |
| C coffee | 11. 04. 02 AM 10:00 | 11. 04. 20 ~ 11. 04. 30 | View | |
| D coffee | – | 11. 04. 10 ~ 11. 04. 30 | Download | 1005 |

OK (a) (b)

(a)

(b)

(a)

(b)

| Coupon name | Reception hour | Term | Status |
|---|---|---|---|
| A restaurant | 11. 04. 01<br>PM 3:00 | 11. 04. 01<br>~<br>11. 04. 10 | View |
| C hair | 11. 04. 05<br>AM 10:00 | 11. 04. 10<br>~<br>11. 05. 10 | View |
| D shopping | | 11. 04. 01<br>~<br>11. 04. 30 | Download |

| Coupon name | Reception hour | Term | Status |
|---|---|---|---|
| A restaurant | 11. 04. 01<br>PM 3:00 | 11. 04. 01<br>~<br>11. 04. 10 | View |
| B coffee | - | 11. 04. 05<br>~<br>11. 04. 20 | View |

(a)

(b)

(a)

(b)

(a)

(b)

(a) (b)

MOBILE TERMINAL AND COUPON MANAGING METHOD THEREOF

Pursuant to 35 U.S.C. §119(a), this application claims the benefit of earlier filing date and right of priority to Korean Application No. 10-2011-0033255, filed on Apr. 11, 2011, the contents of which are hereby incorporated by reference herein in their entirety.

BACKGROUND OF THE INVENTION

1. Field of the Invention

The present invention relates to a mobile terminal, and more particularly, to a mobile terminal and coupon managing method thereof. Although the present invention is suitable for a wide scope of applications, it is particularly suitable for receiving a coupon using coupon information received via broadcast related information.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Recently, as social commerce services are getting the spotlight, a user purchases a discount coupon of a product or service on line. When the user actually purchases a product or service, the user may take advantage of discount using the discount coupon.

However, a method of receiving coupon information or a coupon using a mobile device has not been proposed in detail. And, the present invention may intend to devise a method of receiving coupon information or a coupon using a service (e.g., a broadcast related service, etc.) executable in a related art mobile device.

SUMMARY OF THE INVENTION

Accordingly, the present invention is directed to a mobile terminal and coupon managing method thereof that substantially obviate one or more problems due to limitations and disadvantages of the related art.

An object of the present invention is to provide a mobile terminal and coupon managing method thereof, by which coupon information may be received using broadcast related information and by which a specific coupon may be received using the received coupon information.

Another object of the present invention is to provide a mobile terminal and coupon managing method thereof, by which coupon information related to a currently outputted broadcast program or a broadcast service providing the currently outputted broadcast program may be provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a wireless communication unit configured to receive a broadcast related information, a display unit configured to display the received broadcast related information, a controller configured to extract at least one coupon information from the received broadcast related information, to control the display unit to display the extracted at least one coupon information, and to control the wireless communication unit to received a coupon corresponding to a selected coupon information if the coupon information is selected from the displayed at least one coupon information.

In another aspect of the present invention, a method of managing a coupon in a mobile terminal according to the present invention includes the steps of receiving broadcast related information, extracting at least one coupon information from the received broadcast related information, displaying the extracted at least one coupon information, and receiving a coupon corresponding to a selected coupon information if the coupon information is selected from the displayed at least one coupon information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 5A and FIG. 5B are diagrams of a coupon information list containing at least one coupon information according to the present invention;

FIGS. 9A to 9C are diagrams of a process for displaying a coupon information list associated with a current terminal location according to the present invention;

FIGS. 10A to 10C are diagrams of a process for displaying a coupon information list in accordance with various references according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
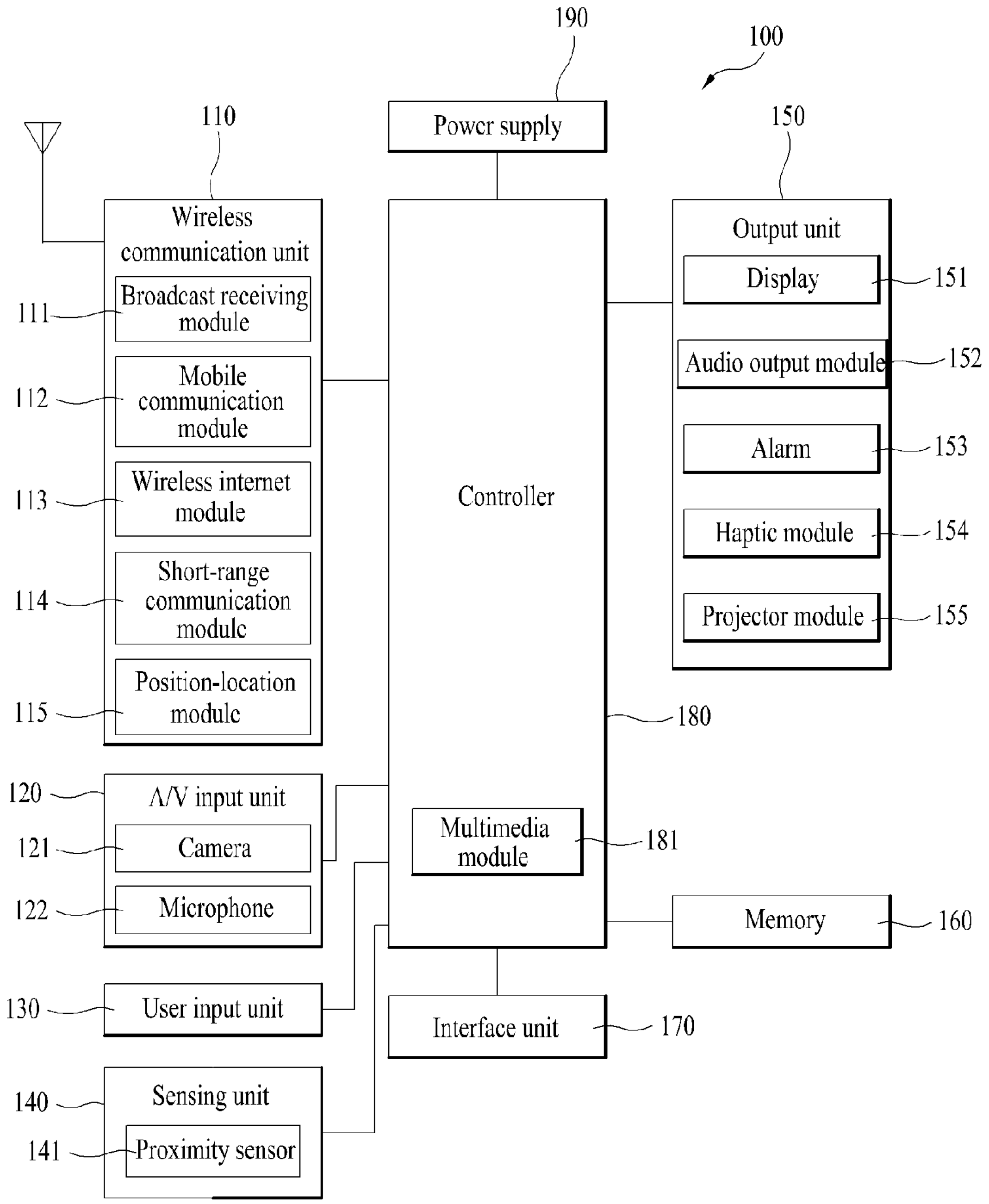
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal mentioned in this specification may include at least one of the former components shown in FIG. 1. If necessary, components not shown in FIG. 1 may be further included.

A coupon mentioned in this specification may mean a ticket for purchasing or using a specific product or a specific service for free or at a price discounted with a predetermined reference in purchasing or using the specific product or the specific service.

Coupon information mentioned in this specification may mean information on a corresponding coupon and may include at least one of coupon providing company information, coupon providing website information, coupon expiry term information, coupon downloadable term information, coupon usable area information, coupon category information, coupon price information, coupon discount rate information, coupon associated broadcast program/service information and the like.

Moreover, according to ATSC-MH technology, coupon information may be received via a service (hereinafter named ESG service) for providing ESG data. And, a coupon may be received via a service (hereinafter named NRT service) for providing NRT (non real time) data.

Prior to the detailed description of a coupon managing method of a mobile terminal according to the present invention, a data structure containing coupon information may be described with reference to FIGS. 2A to 5B as follows.

FIGS. 2A to 2D are diagrams of an ensemble structure according to the present invention, and more particularly, an ensemble structure according to ATSC-MH technology.

Figure 2A:
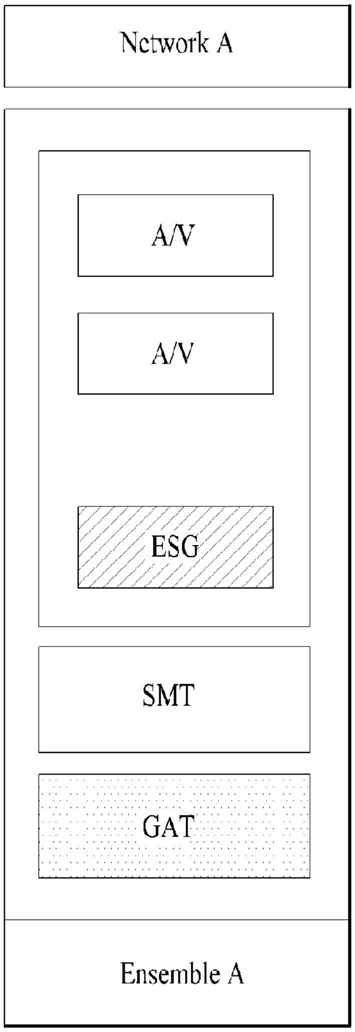
FIGS. 2A to 2D are diagrams of an ensemble structure according to the present invention.

Referring to FIG. 2A, a single network may provide a single ensemble. A/V service (A/V) for providing a broadcast program, ESG service (ESG) for providing a broadcast program or ESG data related to A/V service providing the broadcast program, and a configuration table (SSC-Table) for providing inter-service connection information (GAT), decoding information (SMT) of the services contained in the ensemble and the like may be included in the single ensemble.

Figure 2B:
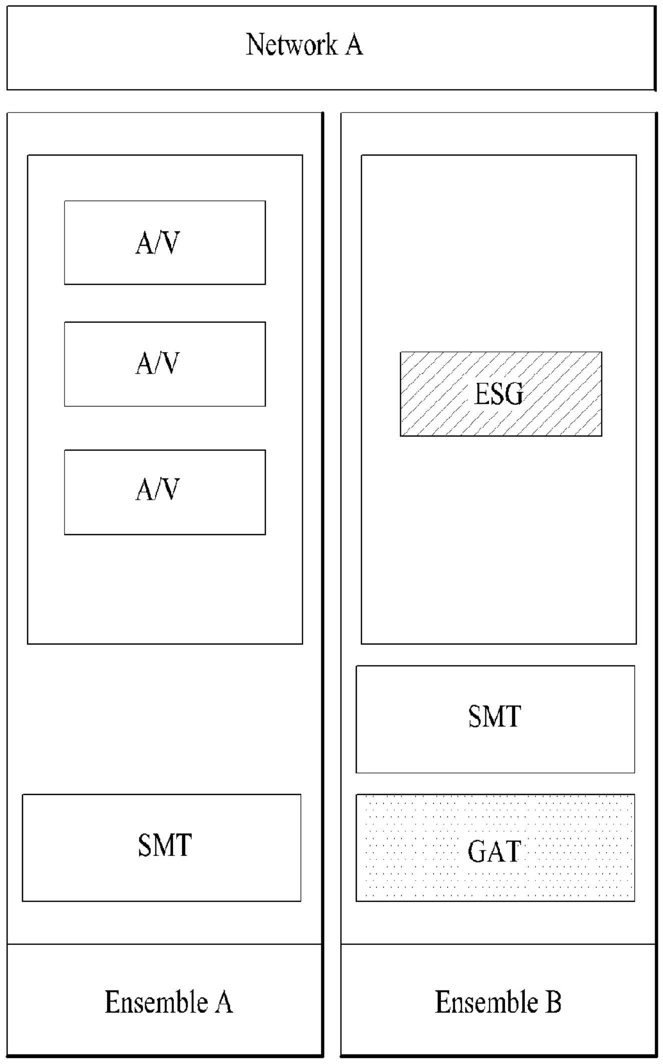

Referring to FIG. 2B, a single network may provide a plurality of ensembles (e.g., ensemble A, ensemble B). In the ensemble A, a plurality of A/V services (A/V) for providing broadcast programs may be included. In the ensemble B, ESG service (ESG) for providing ESG data of the broadcast programs or a plurality of the A/V services provided by the ensemble A may be included. Of course, a configuration table (SSC-Table) for providing configuration information may be included in each of the ensemble A and the ensemble B.

Figure 2C:
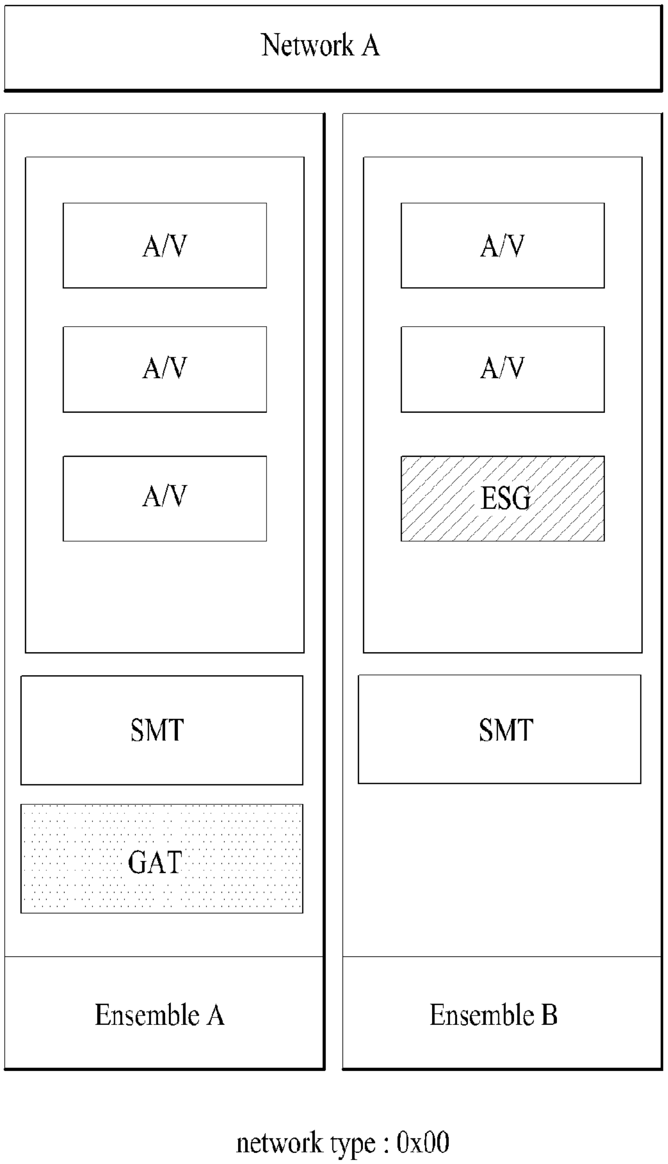

Referring to FIG. 2C, a single network may provide a plurality of ensembles (e.g., ensemble A, ensemble B). In the ensemble A, a plurality of A/V services (A/V) for providing broadcast programs may be included. In the ensemble B, a plurality of A/V services (A/V) for providing broadcast programs and ESG service (ESG) for providing ESG data of broadcast programs provided by the ensemble A and the ensemble B or a plurality of the A/V services provided by the ensemble A and the ensemble B may be included. Of course, a configuration table (SSC-Table) for providing configuration information may be included in each of the ensemble A and the ensemble B.

Figure 2D:
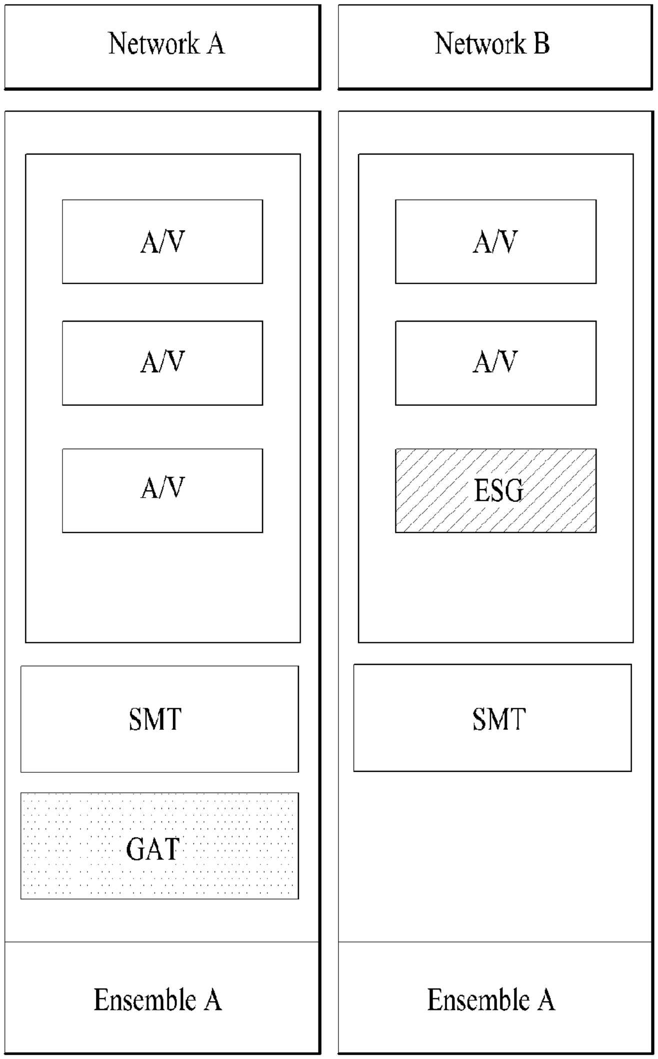

Compared to FIG. 2C, FIG. 2D shows a case that a plurality of networks provide a plurality of ensembles, respectively. In this case, a different frequency band may be assigned to each of a plurality of the networks.

Figure 3:
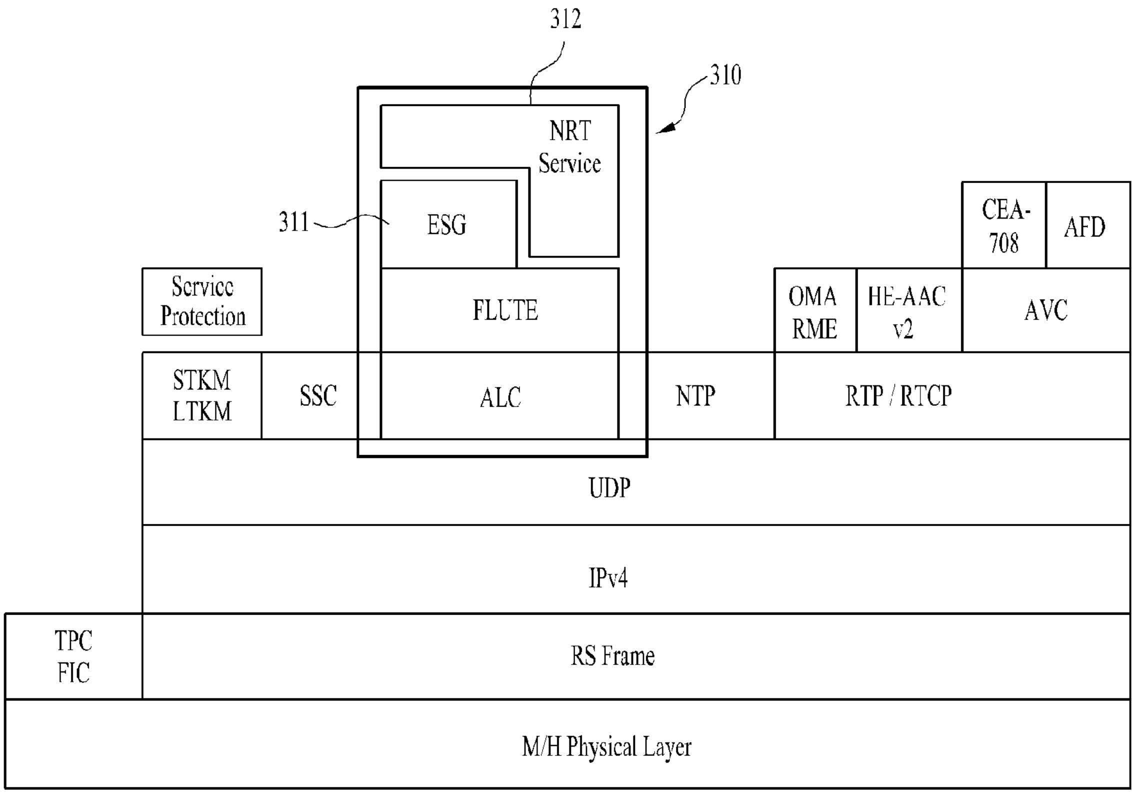
FIG. 3 is a diagram of NRT (non real time) service structure according to the present invention.

FIG. 3 is a diagram of NRT (non real time) service structure according to the present invention.

Referring to FIG. 3, if a single frequency band is set in a tuner stage, M/H physical layer may be formed. If a single ensemble provided by the set frequency band is set, RS frame may be formed. It may be then able to check information provided through the set ensemble using corresponding IP and UDP.

For instance, the information provided through the ensemble may include billing information (STKM, LTKM) contained in the ensemble, information (SSC-Table) on service configuration, information (NTP) related to current hour, information (ALC) 310 (configured with ESG service or NRT service) corresponding to ESG data or NRT data, and information (RTP/RTCP) (configured with A/V service) corresponding to a broadcast program (e.g., A/v data).

In particular, the ESG data 311 may be provided via the ESG service and the NRT data 312 may be provided via the NRT service. Specifically, when a coupon is received via the NRT service, it may be able to use the coupon information contained in the ESG data. Moreover, the ESG data 311 and the NRT data 312 may be provided using FLUTE Protocol.

Figure 4A:
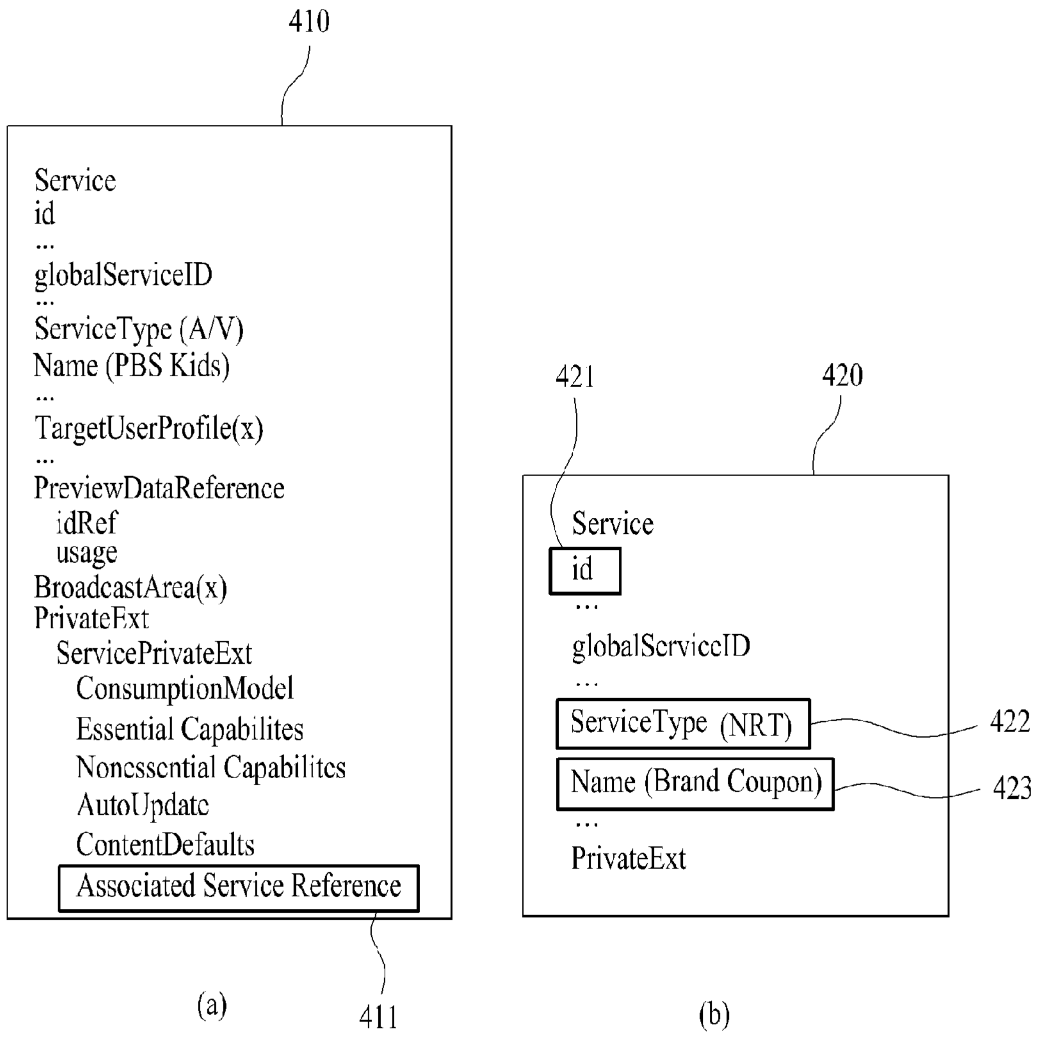
FIGS. 4A to 4C are diagrams of ESG structure containing coupon information according to the present invention.
Figure 4B:
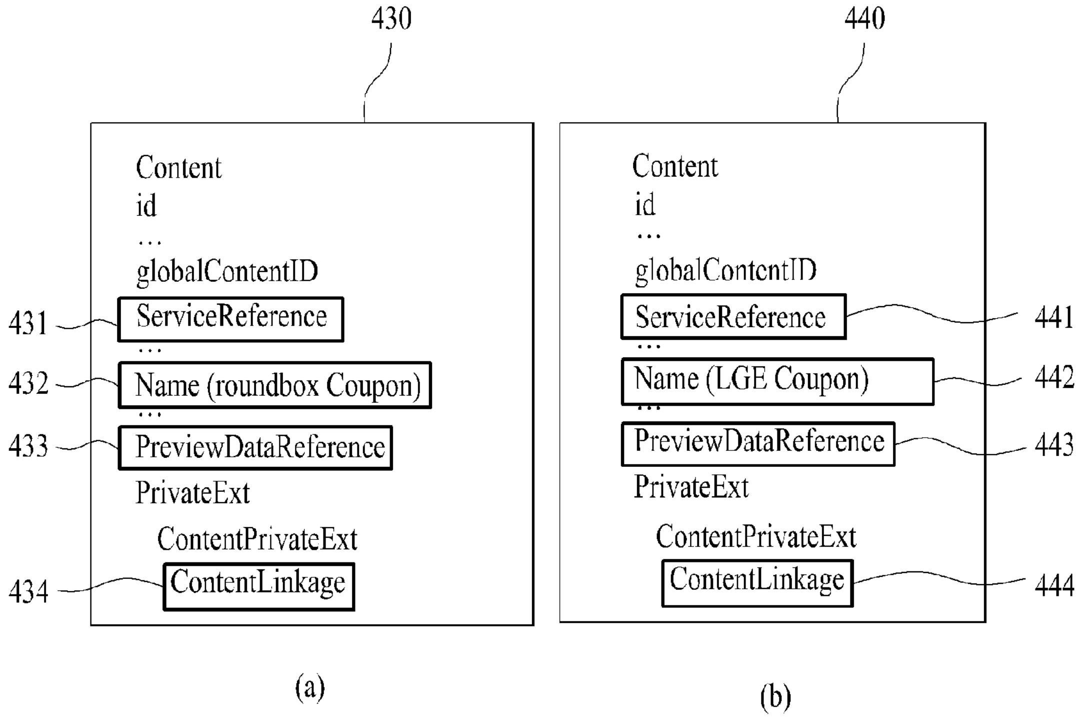
Figure 4C:
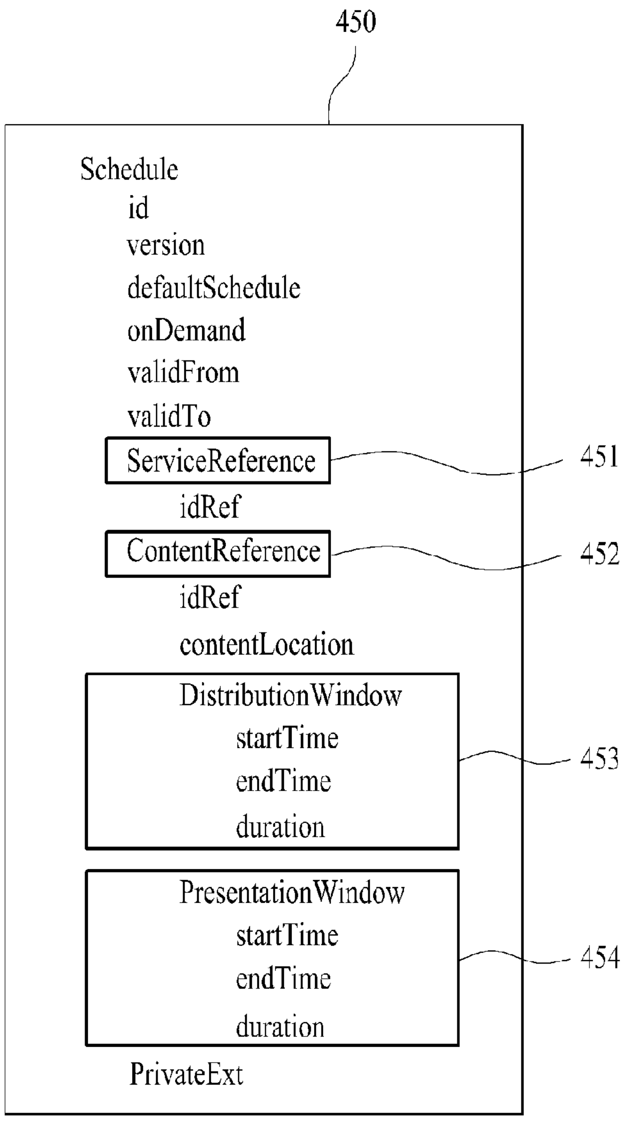

FIGS. 4A to 4C are diagrams of ESG structure containing coupon information according to the present invention. FIG. 5A and FIG. 5B are diagrams of a coupon information list containing at least one coupon information according to the present invention.

Referring to FIG. 4A, ESG data 410 corresponding to A/V service may contain identification information (e.g., ID) (Associated Service Reference) 411 of a service providing coupon information associated with a corresponding A/v service

[FIG. 4A (a)]. And, ESG data 420 related to coupon information may contain corresponding service identification information (e.g., ID) 421, a corresponding service type (NRT) 422 and a name (Brand Coupon) 423 of a corresponding service [FIG. 4A (b)].

Referring to FIG. 4B, ESG data 430/440 corresponding to specific coupon information may contain a service reference (Service Reference) 431/441 linked with a corresponding service identification information (cf. a reference number 421 shown in FIG. 4A), a name (Name) of a corresponding coupon 432/442, an icon image (Preview Data Reference) 433/443 of the corresponding coupon and a location information (Content Linkage) 434/444 within NRT data for downloading the corresponding coupon.

Referring to FIG. 4C, ESG data 450 corresponding to a schedule of specific coupon information may contain a service reference (Service Reference) 451 linked with a corresponding service identification information (cf. a reference number '421' shown in FIG. 4A), an identification information (Content Reference) 452 of a content (cf. a reference number '430/440' shown in FIG. 4B) corresponding to the specific coupon information, a downloadable time information (Distribution Window) 453 (e.g., Start Time, End Time, Duration) of the specific coupon information, and displayable time information (Presentation Window) 454 (e.g., Start Time, End Time, Duration) of the specific coupon information.

According to FIG. 5A and FIG. 5B, it may be able to display a coupon information list created using the ESG data corresponding to the above-described coupon information.

Referring to FIG. 5A, the mobile terminal 100 may extract a service fragment having a service type set to NRT from the ESG data and may be then able to display a service list configured with services for providing coupon information using the extracted service fragment having the service type set to NRT.

Referring to FIG. 5B, if a specific service is selected from the service list shown in FIG. 5A, the mobile terminal 100 may display a coupon information list related to the selected specific service.

Moreover, while a specific broadcast program is being outputted, if the associated service reference (cf. a reference number 411 shown in FIG. 4A) contained in the service fragment (service type: AV) providing the specific broadcast program indicates the service fragment having the service type set to NRT, the mobile terminal 100 may display a coupon information list related to the service fragment having the service type set to NRT [cf. FIG. 5B].

The configuration of the coupon information shown in FIG. 5B may be described in detail as follows.

First of all, a service coupon name (Name) 511 may correspond to a name (Brand Coupon) of a corresponding service, a coupon icon 512 may corresponding to an icon image (Preview Data reference) 433/443 of a corresponding coupon, a per-coupon name 513 may correspond to a name (Name) 432/442 of the corresponding coupon, and a downloadable time 515 may correspond to a downloadable time information (Distribution Window) 453 of specific coupon information. Moreover, a per-coupon reception hour 514 may correspond to an hour at which the corresponding coupon has bee substantially downloaded. And, a per-coupon status 516 may correspond to a presence or non-presence of a download of the coupon of the corresponding coupon information.

In the following description, a method of managing a coupon in a mobile terminal according to the present invention may be explained in detail with reference to FIGS. 6 to 15B.

Figure 6:
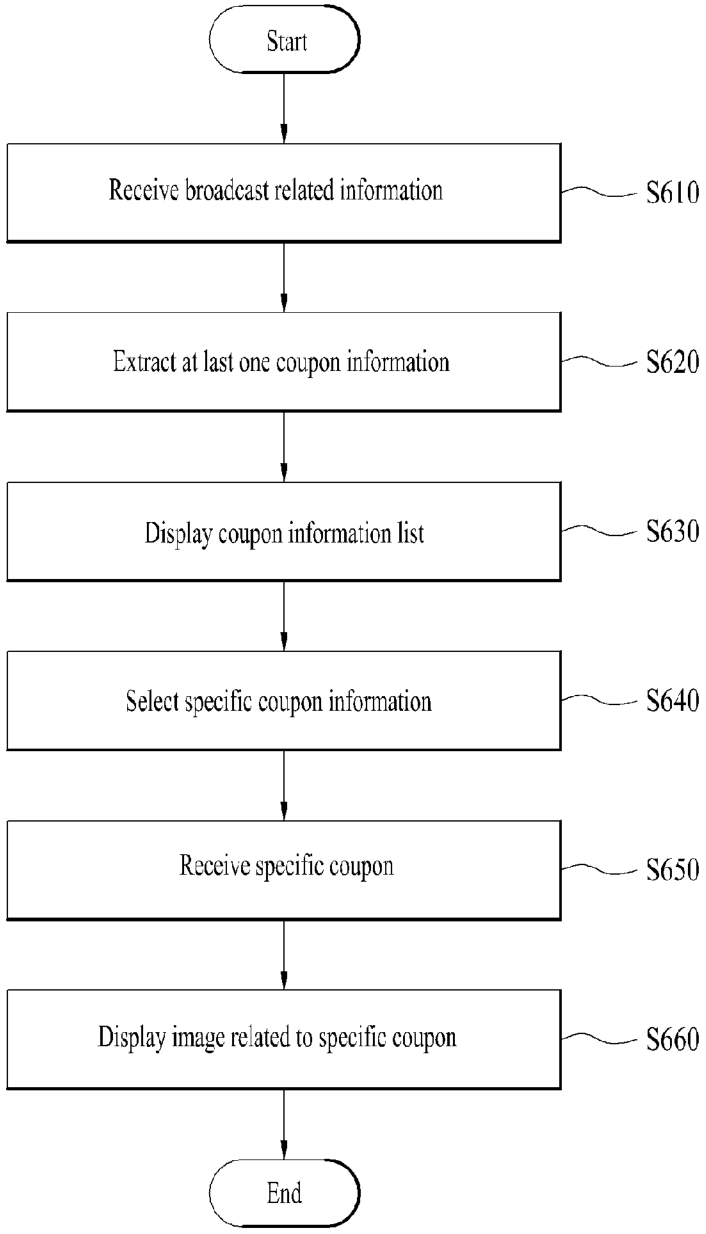
FIG. 6 is a flowchart of a method of managing a coupon in a mobile terminal according to one embodiment of the present invention.

FIG. 6 is a flowchart of a method of managing a coupon in a mobile terminal according to one embodiment of the present invention.

Referring to FIG. 6, the mobile terminal 100 may receive broadcast related information via the wireless communication unit 110 [S610].

In this case, the broadcast related information may mean information on a broadcast program transmitted to the mobile terminal 100 or information on a broadcast service that provides the broadcast program. And, the broadcast related information may include a name information of a broadcast program/service, a schedule information of the broadcast program/service, a synopsis/character information of the broadcast program, a broadcast program organization information of the broadcast service and the like.

For instance, as mentioned in the foregoing description, the broadcast related information may be contained in the ESG (electronic service guide) or EPG (electronic program guide).

In the receiving step S610, the mobile terminal 100 may receive the broadcast related information via a broadcasting network or wireless internet. Via the broadcasting network, the broadcast related information may receive the broadcast related information using the broadcast receiving module 111. Via the wireless internet, the mobile terminal 100 may receive the broadcast related information using the wireless internet module 113.

Specifically, according to the ATSC-MH technology, at least one broadcast service may be included in at least one ensemble and ESG may be provided through a specific broadcast service of a specific ensemble [cf. FIGS. 2A to 2D]. moreover, at least one coupon information may be provided to the mobile terminal 10 by being contained in ESG data and a coupon (or a coupon related image) corresponding to coupon information may be provided to the mobile terminal 100 via NRT service by being contained in NRT (non real time) data. Hence, in case that a shift between broadcast services or ensembles, which differ from each other in ESG data or NRT data, coupon information and a coupon corresponding to the coupon information may be changed.

In the receiving step S610, the mobile terminal 100 may be able to receive broadcast related information from an external server (not shown in the drawing). In this case, the external server may include a server (e.g., an individual server) for managing the broadcast related information only or a server (e.g., an integrated server) for managing a broadcast program/service associated with the broadcast related information.

In the receiving step S610, in accordance with a term or timing point designated by the mobile terminal 100 (or the external server), the mobile terminal 100 may receive the broadcast related information. In this case, the term or the timing point may be designated by the mobile terminal 100 or a user selection. In case that a validity term is set in the broadcast related information, the mobile terminal 100 may receive the broadcast related information if the set validity term expires. Alternatively, in case that a validity term is set in the broadcast related information, the mobile terminal 100 may receive the broadcast related information prior to a predetermined time from an expiry timing point of the validity term.

In the receiving step S610, in case of entering a broadcast mode or turning on the broadcast receiving module 111, the mobile terminal 100 may receive the broadcast related information. In doing so, the mobile terminal 100 may receive the broadcast related information each time the broadcast mode is entered or the broadcast receiving module 111 is turned on. Alternatively, only if the broadcast mode is initially entered or the broadcast receiving module 111 is initially turned on, the mobile terminal 100 may receive the broadcast related information. Thereafter, the mobile terminal 100 may determine whether to receive the broadcast related information in accordance with a user selection.

After a request signal for the broadcast related information has been transmitted to the external server, the mobile terminal 100 may receive the broadcast related information. Even if the request signal for the broadcast related information is not transmitted, the mobile terminal 100 may receive the broadcast related information from the external server unilaterally.

The mobile terminal 100 may save the received broadcast related information in the memory 160 under the control of the controller 180. Moreover, in case that a previously stored broadcast related information exists, the controller 180 may update the previously stored broadcast related information into the received broadcast related information. Alternatively, after the controller 180 has compared the received broadcast related information and the previously stored broadcast related information to each other, if there is a different part in-between, the controller 180 may be able to update the different part with reference to the received broadcast related information.

The mobile terminal 100 may extract at least one coupon information from the received broadcast related information under the control of the controller 180 [S620].

The extracting step S620 may be automatically executed if the broadcast related information is received. The receiving step S610 may be executed if an extraction command is inputted by a user. In this case, the mobile terminal 100 may be provided with a menu item, a key or a key zone to receive an input of the extraction command.

In the extracting step S620, the mobile terminal 100 may extract all the coupon informations contained in the broadcast related information or may extract the coupon information that meets a prescribed condition only. For instance, the prescribed condition may include at least one of a category (e.g., restaurant, coffee, movie, sports, shopping, hair, etc.) of a corresponding coupon, a validity term, a downloadable term, a usable area, a discount rate, a price and the like.

In this case, the prescribed condition may be set in accordance with a user input. Alternatively, the prescribed condition may be set with reference to a current terminal status (e.g., location, etc.) or a currently outputted broadcast program/service.

The setting of the prescribed condition in accordance with the user input may be described as follows. First of all, if a user inputs such a prescribed condition as 'restaurant' and 'downloadable term: Apr. 1 to 10, 2011', the controller 180 may be able to extract coupon information of a coupon, of which category and downloadable term are 'restaurant' and 'downloadable term: Apr. 1 to 10, 2011', respectively, from the broadcast related information.

The setting of the prescribed condition in accordance with the current terminal location may be described as follows. First of all, if a current terminal location is ' building, Gangnam Station', the controller 180 may be able to extract coupon information of a coupon, of which usable area is area within a predetermined radius from the ' building, Gangnam Station' or a city having the '** building, Gangnam Station' belong thereto, from the broadcast related information.

The setting of the prescribed condition in accordance with the currently outputted broadcast program/service may be described as follows. First of all, assuming that a specific broadcast program of a current specific broadcast service is being received and outputted, the controller 180 may extract coupon information of a downloadable coupon only within a broadcast time of the specific broadcast program, coupon information of a coupon corresponding to such an item related to the specific broadcast program as a product, a shop, a service, a movie and the like, or coupon information of a coupon downloadable in case of using the specific broadcast service only.

In the extracting step S620, under the control of the controller 180, the mobile terminal 100 may extract at least one of coupon information of a coupon downloadable or available at a current timing point and coupon information of a coupon having a discount rate over a predetermined reference.

Moreover, under the control of the controller 180, the mobile terminal 100 may save the extracted coupon information in the memory 160.

The mobile terminal 100 may display at least one coupon information extracted in the extracting step S520 using the output unit 150 [S630]. In particular, the mobile terminal 180 may use the display unit 151 of the output unit 150.

In the following description, assume that the at least one coupon information may correspond to each of at least one coupon. And, assume that the at least one coupon information may be displayed as a list. In the following description, a list containing the at least one coupon information may be named a coupon information list.

The mobile terminal 100 may perform a displaying step S630 in the course of receiving and outputting a broadcast program. Therefore, an output screen of the broadcast program and the coupon information list may be displayed on the display unit 151 together.

For instance, after a whole screen has been divided into a $1^{st}$ region and a $2^{nd}$ region, the output screen of the broadcast program and the coupon information list may be displayed on the $1^{st}$ region and the $2^{nd}$ region, respectively. Alternatively, the coupon information list may be displayed as a popup window on the output screen of the broadcast program. Alternatively, the coupon information list may be displayed by being overlaid over the output screen of the broadcast program.

The displaying step S630 may be performed after completion of the extracting step S620. Alternatively, the displaying step S630 may be performed if a user inputs a command for displaying the coupon information list. For instance, in order to receive an input of the command for displaying the coupon information list, the mobile terminal 100 may be provided with at least one of a separate menu item, a key or a key zone.

In the following description, a process for inputting a coupon information list displaying command may be explained with reference to FIG. 7A and FIG. 7B.

Figure 7A:
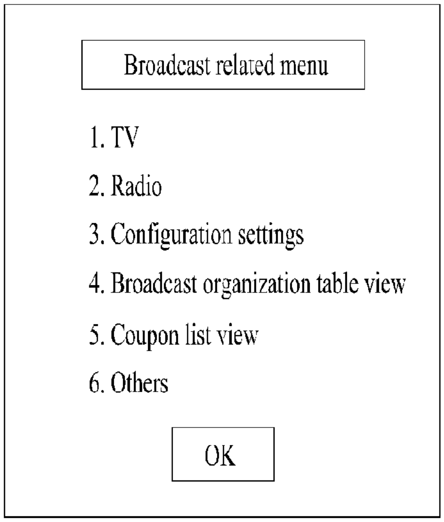
FIG. 7A and FIG. 7B are diagrams of a process for inputting a coupon information list displaying command according to the present invention.
Figure 7B:
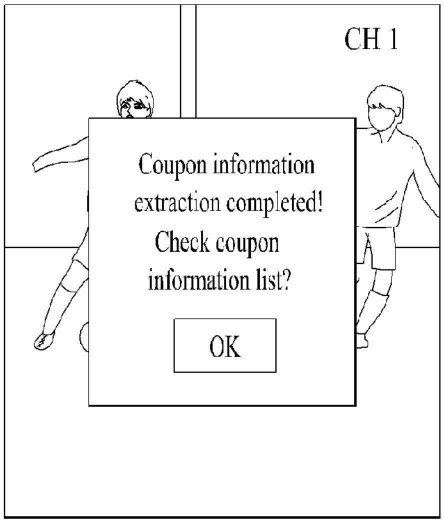

FIG. 7A and FIG. 7B are diagrams of a process for inputting a coupon information list displaying command according to the present invention.

Referring to FIG. 7A, the mobile terminal 100 may be able to display broadcast related menu items by a menu search conducted by a user. If a menu item 'coupon information list view' is selected, the mobile terminal 100 may be able to receive an input of a coupon information list displaying command. Although FIG. 7A shows a case that a broadcast program is not outputted, the embodiment shown in FIG. 7A may be applicable in the course of outputting a broadcast program.

Referring to FIG. 7B, in case that an operation of extracting coupon information from broadcast related information is completed in the course of outputting a broadcast program, the mobile terminal 100 informs a user that the coupon information extracting operation has been completed. Therefore, the user may be able to input a coupon information list displaying command. Although FIG. 7B shows a case that a broadcast program is outputted, the embodiment shown in FIG. 7B may be applicable despite that a broadcast program is not outputted.

Referring now to FIG. 6, in the displaying step S630, the mobile terminal 100 may be able to diversely configure contents of coupon information(s) contained in the coupon information list under the control of the controller 180. For instance, the contents of the coupon information contained in the coupon information list may include at least one of a name of a corresponding coupon, a validity term, a downloadable term, a usable area, a current status (e.g., prior to download Download, download completed_View), a discount rate, a price, a download hour (e.g., reception hour) in case of a download completion of the corresponding coupon, and the like. Moreover, a user may be able to select the contents of the coupon information, which will be contained in the coupon information list.

In the displaying step S630, if a specific broadcast program of a specific broadcast service is being received and outputted, under the control of the controller 180, the mobile terminal 100 may be able to display the coupon information list related to the specific broadcast program or the specific broadcast service in the course of outputting the specific broadcast program or using the specific broadcast service only. In doing so, the coupon information related to the specific broadcast program or the specific broadcast service may be extracted in the extracting step S620.

For instance, the coupon information related to the specific broadcast program or the specific broadcast service may include may include one of coupon information on a coupon downloadable during a broadcast time of the specific broadcast program or in the course of using the specific broadcast service, coupon information on a coupon on a place, a service, a product, a shop or the like in association with the specific broadcast program, a coupon matching a genre or viewable ages of the specific broadcast program or the specific broadcast service, coupon information on a coupon issued by a broadcaster providing the specific broadcast program or the specific broadcast service and the like. In particular, the coupon matching the genre may include a sports game related coupon if the genre is 'sports'. The coupon matching the viewable ages may include a bar related coupon if the viewable ages correspond to 'over 19'.

This may be described in detail with reference to FIGS. 8A to 8C as follows.

Figure 8A:
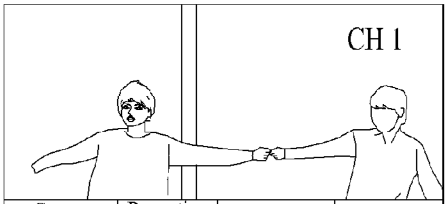
FIGS. 8A to 8C are diagrams of a process for displaying a coupon information list associated with a currently outputted broadcast program according to the present invention.
Figure 8A:
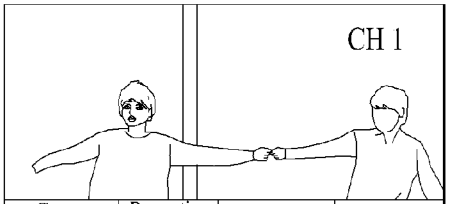
Figure 8B:
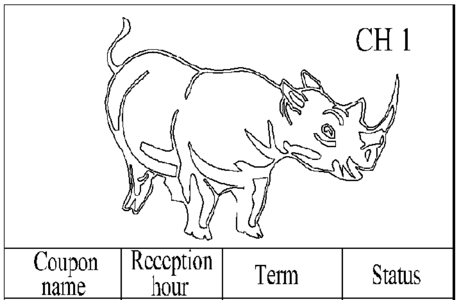
Figure 8B:
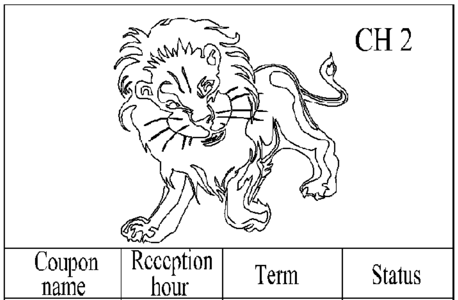
Figure 8C:
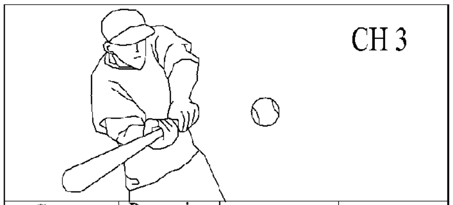

FIGS. 8A to 8C are diagrams of a process for displaying a coupon information list associated with a currently outputted broadcast program according to the present invention.

Referring to FIG. 8A, in case of receiving an input of a coupon information list displaying command in the course of outputting a broadcast program, the mobile terminal 100 may display a coupon information list 810 on a prescribed region of a screen.

In particular, referring to FIG. 8A (a), in case of receiving the coupon information list displaying command, the mobile terminal 100 displays the coupon information list 810. And, the mobile terminal 100 may be also able to represent a status per coupon information as 'Download' because of the coupon information prior to downloading a corresponding coupon.

Alternatively, referring to FIG. 8A (b), in case of receiving the coupon information list displaying command, the mobile terminal 100 displays the coupon information list 810. The mobile terminal 100 may be able to download the corresponding coupon per coupon information sequentially or simultaneously. The mobile terminal 100 may be able to represent a status of download completed coupon information as 'View'. And, the mobile terminal 100 may be able to represent a status of the coupon information prior to download as 'Download'.

Referring to FIG. 8B (a), after a $1^{st}$ broadcast program of a $1^{st}$ broadcast service CH1 has been completely outputted, if a $2^{nd}$ broadcast program of the $1^{st}$ broadcast service is outputted (i.e., a broadcast program switching in the same broadcast service), the mobile terminal 100 may stop displaying the coupon information list 810 related to the $1^{st}$ broadcast program and may then display a coupon information list 810 related to the $2^{nd}$ broadcast program. Alternatively, in addition to coupon informations related to the $1^{st}$ broadcast program, the mobile terminal 100 may be able to display a coupon information list containing coupon informations related to the switched $2^{nd}$ broadcast program.

Meanwhile, if the coupon information list related to the $1^{st}$ broadcast service is being displayed in the course of outputting the $1^{st}$ broadcast program, the configuration of the coupon information list may not be changed despite outputting the $2^{nd}$ broadcast program.

Referring to FIG. 8B (b), in case of switching the $1^{st}$ broadcast service CH1 to a $2^{nd}$ broadcast service CH2 (e.g., a broadcast service switching), the mobile terminal 100 may stop displaying the coupon information list 810 related to the $1^{st}$ broadcast service and may then display a coupon information list 810 related to the $2^{nd}$ broadcast service. Alternatively, in addition to coupon informations related to the $1^{st}$ broadcast service, the mobile terminal 100 may be able to display a coupon information list containing coupon informations related to the switched $2^{nd}$ broadcast service.

Meanwhile, in case that the coupon information of the $1^{st}$ broadcast service is equal to that of the $2^{nd}$ broadcast service, the configuration of the coupon information list may not be changed despite switching the broadcast service.

Referring to FIG. 8C, if a broadcast program (e.g., genre: sports) provided from a $3^{rd}$ broadcast service CH3 is being outputted, the mobile terminal 100 may be able to display a coupon information list 810 including coupon informations of coupons belonging to the category 'sports'. For instance, the coupons belonging to the category 'sports' may include a sports watching coupon, a sports goods coupon and the like. In this case, if the broadcast program is 'baseball related program', a baseball game watching coupon, a baseball goods coupon and the like may be included.

Meanwhile, a currently outputted broadcast program may belong to at least one of various genres including drama, news, music, economy and the like. And, a coupon information list may include coupon informations of coupons that match a corresponding genre [not shown in the drawing].

Referring now to FIG. 6, in the displaying step S630, under the control of the controller 180, the mobile terminal 100 may obtain a current terminal location using the position location module 115 and may be then able to display a coupon information list containing at least one coupon information corresponding to an area to which the obtained current terminal location belongs. In doing so, the at least one coupon information corresponding to the current terminal location may be extracted in the extracting step S620.

For instance, the area, to which the current terminal location belongs, may include an area within a predetermined radius from the current terminal location or an administrative district (unit: city, state, province, etc.) to which the current terminal location belongs. In this case, the predetermined radius or the administrative district may be determined by a user or a corresponding coupon provider.

Moreover, the at least one coupon information corresponding to the area, to which the current terminal location belongs, may be displayed not on a list but on a map image. For instance, it may be able to display each identifier at a point corresponding to each of the at least one coupon information on the map image corresponding to the current terminal location.

This may be further described in detail with reference to FIGS. 9A to 9C as follows. For clarity and convenience of the following description, assume that an area, to which a current terminal location belongs, may lie within a radius of 5 km from the current terminal location.

Figure 9A:
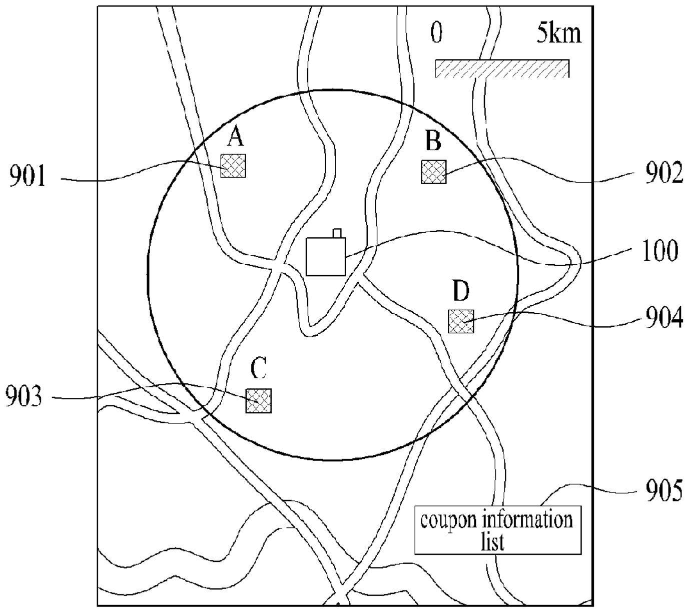
Figure 9B:
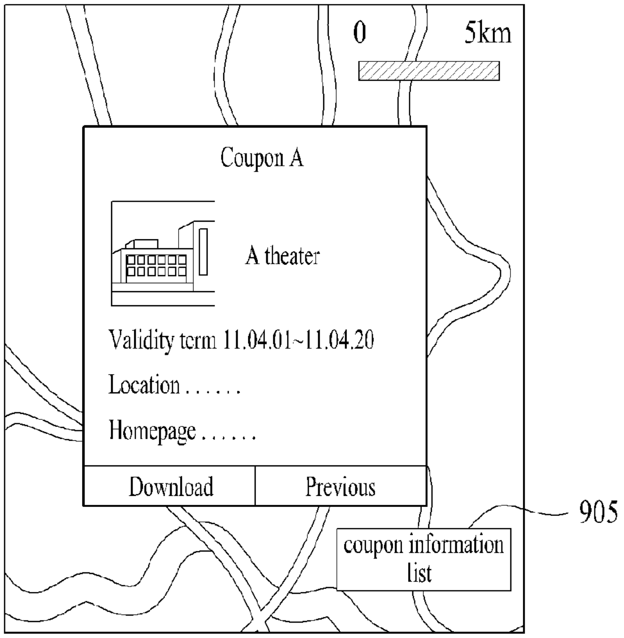

FIGS. 9A to 9C are diagrams of a process for displaying a coupon information list associated with a current terminal location according to the present invention.

Referring to FIG. 9A, the mobile terminal 100 may display a map image and may be then able to display identifiers (hereinafter named $1^{st}$ to $4^{th}$ identifiers) 901 to 904 of coupons, which are usable at places (e.g., restaurant, beauty shop, health club, etc.) located within a radius of 5 km from a current terminal location on the map image, on the corresponding places, respectively. For instance, a coupon name, a coupon icon, a name (or address) of a coupon usable place, a status (e.g., a presence or non-presence of a previous download) and the like may be displayed together on each of the $1^{st}$ to $4^{th}$ identifiers 901 to 904.

In case of displaying an image inputted via the camera 121 as a preview, the mobile terminal 100 may activate an augmented reality program to display the $1^{st}$ to 4th identifiers 901 to 904 within the preview image. In doing so, each of the $1^{st}$ to $4^{th}$ identifiers 901 to 904 may be displayed at a point indicating the corresponding place. Of course, the mobile terminal 100 may be able to display an identifier in accordance with augmented reality program activation in an image previously stored in the memory 160 or an image provided by the external server as well as the preview image. In this case, the image previously stored in the memory 160 or the image provided by the external server may mean a virtual image corresponding to the current terminal location.

Referring to FIG. 9B, if a user selects the $1^{st}$ identifier 910 corresponding to the coupon A in FIG. 9A, the mobile terminal 100 may be able to display an image for the coupon A. In particular, the mobile terminal 100 may determine whether the coupon A was previously downloaded. If the coupon A was not previously downloaded, the mobile terminal 100 may download the coupon A and may then display the image for the coupon A. If the coupon A was previously downloaded, the mobile terminal 100 may bring the image for the coupon A from the memory 160 and may then display the image for the coupon A. The coupon download may be further described in detail as follows.

First of all, for instance, the image for the coupon A may include one of a coupon-A image (including validity term, address/contact/homepage address of a coupon-usable business enterprise, price information, discount rate, etc.), a code image of the coupon A, coupon-A providing business enterprise image, goods/service image related to the coupon A, and the like.

Referring to FIG. 9C, the mobile terminal 100 may display a coupon information list in which coupon informations of coupons usable for the places (e.g., restaurants, beauty shops, health clubs, etc.) located within a radius of 5 km from a current terminal location (e.g., XX building, Gangnam Station) are contained. This coupon information may refer to the former description. Moreover, if a key zone of the coupon information list 905 is selected, it may be able to configure the screen shown in FIG. 9C, and vice versa.

Referring now to FIG. 6, in the displaying step S630, the mobile terminal 100 may be able to configure or arrange the coupon information list to match a prescribed reference under the control of the controller 180. For instance, the prescribed reference may include at least one of a presence or non-presence of download, a downloadable term, a broadcast service, a coupon usable area, a validity term, a category and the like. The prescribed reference may be set by a user. Alternatively, the prescribed reference may be randomly set by the terminal 100.

This may be further described in detail with reference to FIGS. 10A to 10C as follows.

Figure 10A:
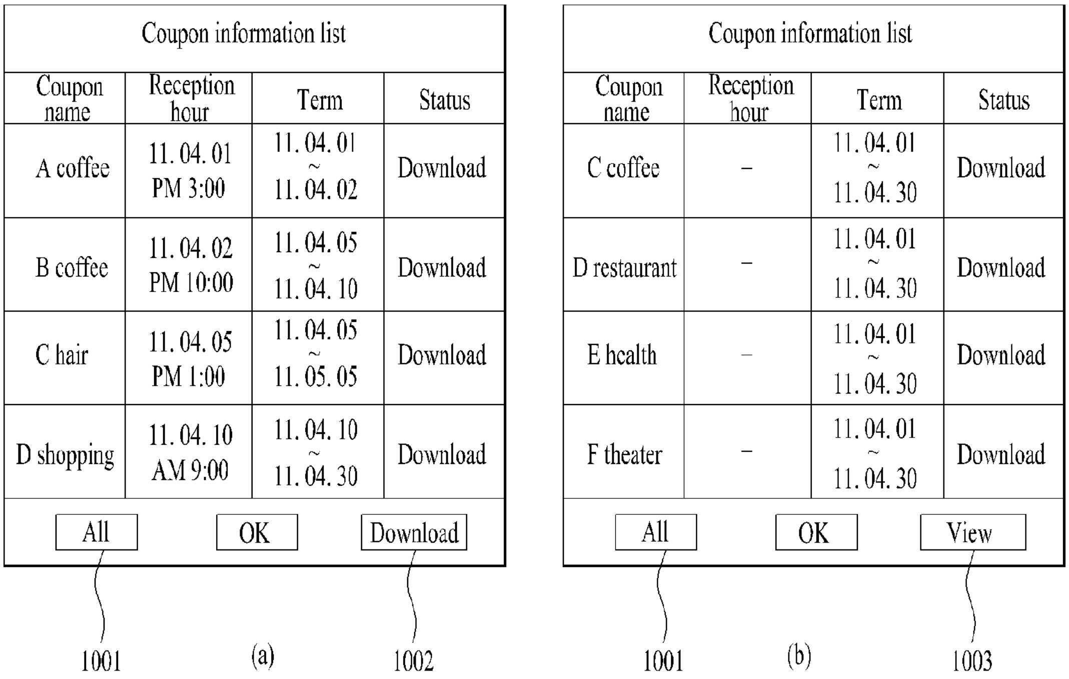
Figure 10C:
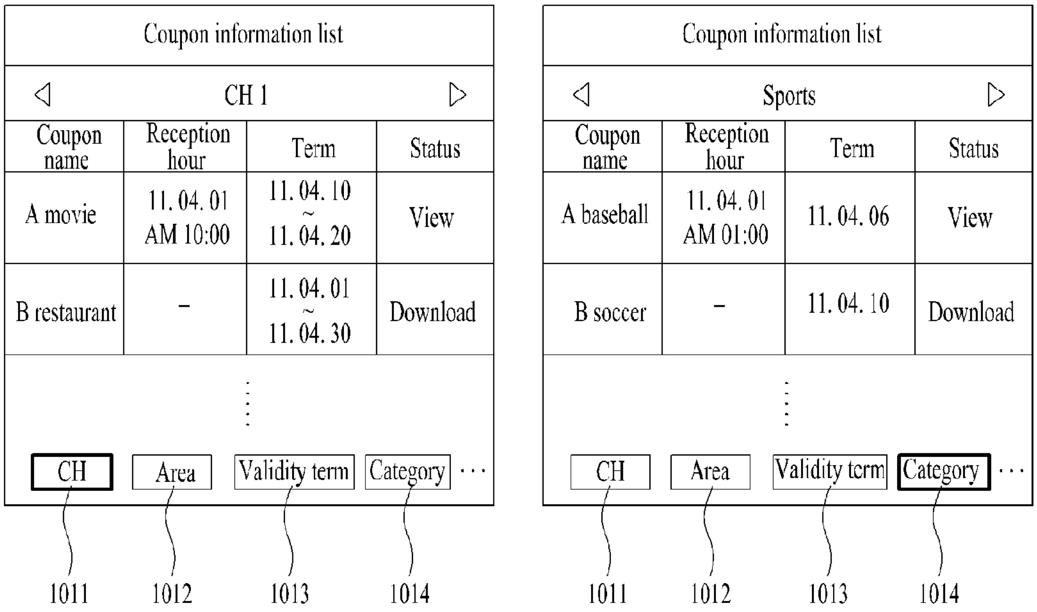

FIGS. 10A to 10C are diagrams of a process for displaying a coupon information list in accordance with various references according to the present invention.

Referring to FIG. 10A, the mobile terminal 100 may display a coupon information list (hereinafter named a post-download coupon information list, Status: View) containing coupon informations of download completed coupons only [FIG. 10A (a)] or may display a coupon information list (hereinafter named a pre-download coupon information list, Status: View) containing coupon informations of coupons prior to download only [FIG. 10A (b)]. Zones 1001 and 1002 for receiving inputs of a command for displaying an integrated coupon information list and a command for displaying a pre-download coupon information list may be displayed on a prescribed region of the screen shown in FIG. 10A (a), respectively. And, zones 1001 and 1003 for receiving inputs of a command for displaying an integrated coupon information list and a command for displaying a post-download coupon information list may be displayed on a prescribed region of the screen shown in FIG. 10A (b), respectively. In this case, the integrated coupon information list may mean a coupon information list containing the coupon informations of the download completed coupons and the coupon informations of the coupons prior to download all.

Referring to FIG. 10B, while a coupon information list is displayed, the mobile terminal 100 may be able to identifiably display coupon informations 1004 and 1005 of coupons downloadable at current hour on current date. Moreover, the coupon information of a downloadable term expiring coupon or coupon information of a coupon, of which downloadable term is not effective yet, may not be displayed at all or may be blurred.

Referring to FIG. 10C, the mobile terminal 100 may display a coupon information list (including coupon informations corresponding to a specific broadcast service) per broadcast service [FIG. 10C (a)] or may display a coupon information list (including coupon informations corresponding to a specific category) per category [FIG. 10C (b)]. Moreover, the mobile terminal 100 may be able to display a coupon information list in accordance with such a various reference as a coupon usable area, a validity term, a downloadable term and the like and may be able to display key zones 1011 to 1014 for receiving selections of the corresponding references respectively on a prescribed region of a screen.

At least one of the configuration conditions or references of the coupon information list may be combined together to create a coupon information list corresponding to the combination [not shown in the drawing]. For instance, it may be able to create such a coupon information list as including coupon informations matching 'Coupon usable area: Area A' (i.e., $2^{nd}$ condition) among coupon informations matching 'Specific broadcast service' (i.e., $1^{st}$ condition). For another instance, it may be able to create such a coupon information list as including coupon informations matching 'Downloadable term: Apr. 10 to 20, 2011' (i.e., $2^{nd}$ condition) among coupons matching '$1^{st}$ broadcast service' (i.e., $1^{st}$ condition).

Moreover, the coupon informations included in the coupon information list may be sequentially arranged in order of one of an imminent downloadable term, a high discount rate (or a low discount rate), a low coupon price (or a high coupon price), an imminent validity term, a coupon usable area closer to a current terminal location, a presence or non-presence of download and the like.

Referring now to FIG. 6, the mobile terminal 100 may receive a specific one of the at least one or more coupon informations included in the coupon information list [S640]. In particular, the mobile terminal 100 may receive a selection action (e.g., a touch action) on the specific coupon information from a user via the user input unit 130.

Moreover, in the selecting step S640, the mobile terminal 100 may be able to receive a selection of at least one specific coupon information.

The mobile terminal 100 may receive a specific coupon corresponding to the specific coupon information selected in the selecting step S640 using the wireless communication unit 110, under the control of the controller 180 [S650]. In this case, the reception of the specific coupon may mean that the specific coupon is downloaded from an external server that provides the specific coupon.

For instance, the specific coupon may be received via broadcasting network or wireless internet. The reception via the broadcasting network may be performed using the broadcast receiving module 111. And, the reception via the wireless internet may be performed using the wireless internet module 113.

In particular, under the control of the controller 180, the mobile terminal 100 may determine whether the specific coupon corresponding to the selected specific under the control of the controller 180 is previously downloaded. If the specific coupon is not previously downloaded, the mobile terminal 100 may perform the receiving step S650. Otherwise, the mobile terminal 100 may not perform the receiving step S650.

In the receiving step S650, the mobile terminal 100 may receive a coupon image of the specific coupon, a code image, a related product/service image, a related business enterprise image, a homepage image of a related business enterprise and the like. And, the mobile terminal 100 may receive coupon related informations to display within the images. In the following description, each of the above images may be named an image related to the specific coupon.

A process for receiving a specific coupon by ATSC-MH is described in detail as follows.

First of all, if a specific under the control of the controller 180 is selected, the controller 180 opens a channel of a specific broadcast service (different from a broadcast service that provides ESG data containing specific coupon information) that provides a specific coupon (or an image related to the specific coupon) corresponding to the selected specific under the control of the controller 180 and may be then able to receive the specific coupon provided by the broadcast service. For instance, the broadcast service for providing the specific coupon may include NRT (non real time) service.

In doing so, the mobile terminal 100 may identify the specific coupon having a coupon identification information matching a coupon identification information (e.g., ContentLinkage shown in FIG. 4B) which is one of specific coupon informations. The mobile terminal 100 may be then able to receive the identified specific coupon.

The mobile terminal 100 may display an image related to the specific coupon received in the receiving step S650 using the display unit 151, under the control of the controller 180 [S660]. If the specific coupon is previously received [i.e., the receiving step S650 is unnecessary], the image related to the specific coupon stored in the memory 160 may be displayed in the displaying step S660.

Therefore, a user may be able to use the specific coupon by showing the displayed specific coupon to a corresponding shop or a corresponding business enterprise [Off-line] or by inputting the identification information of the displayed specific coupon to a corresponding accessed website [On-line].

This is described in detail with reference to FIG. 11A and FIG. 11B as follows.

Figure 11A:
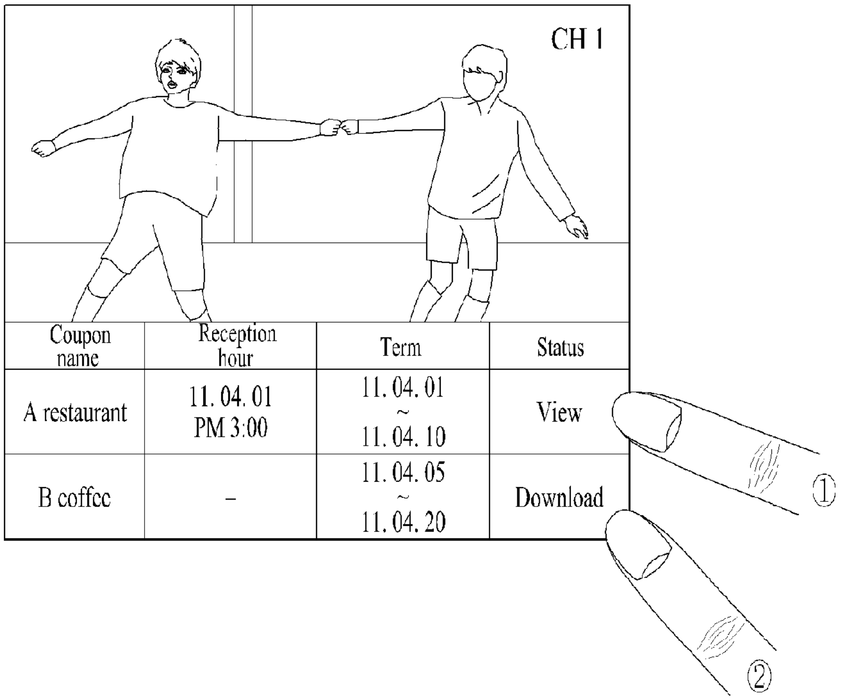
FIG. 11A through FIG. 11C are diagrams for displaying a specific coupon corresponding to a specific coupon information selected from a coupon information list according to the present invention.
Figure 11B:
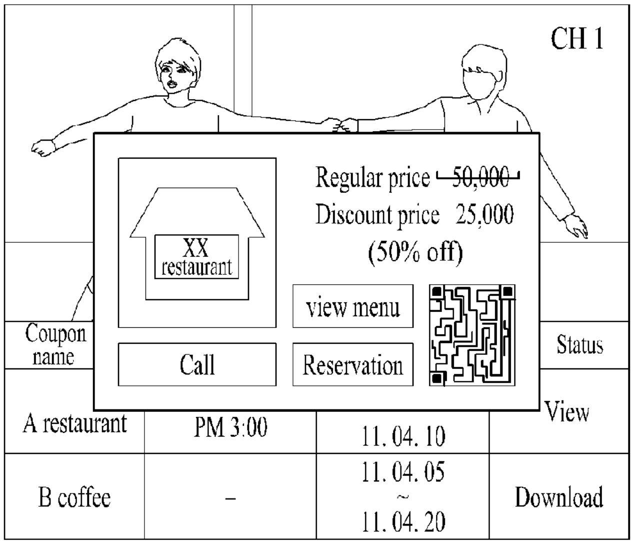

FIG. 11A and FIG. 11B are diagrams for displaying a specific coupon corresponding to a specific coupon information selected from a coupon information list according to the present invention.

Referring to FIG. 11A, the mobile terminal 100 may display a coupon information list while outputting a broadcast program. Of course, the coupon information list may be displayed at any time irrespective of the outputting of the broadcast program.

Referring to FIG. 11B, if a download-completed coupon information (Status: View) is selected from the coupon information list shown in FIG. 11A, the mobile terminal 100 may page and display a coupon image of a previously downloaded coupon.

Figure 11C:
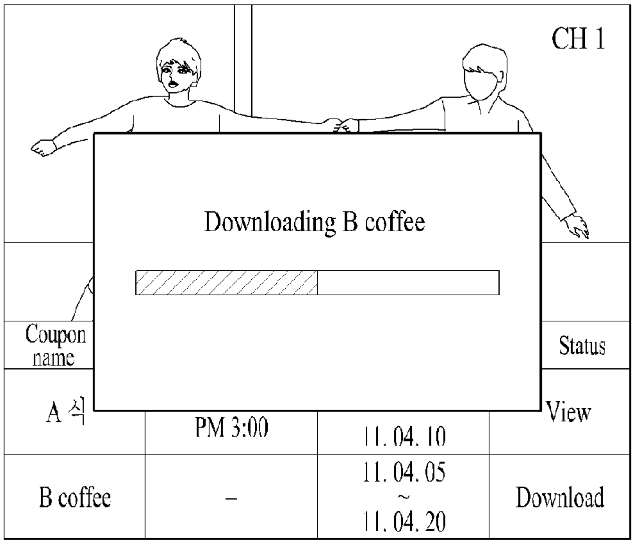
Figure 11C:
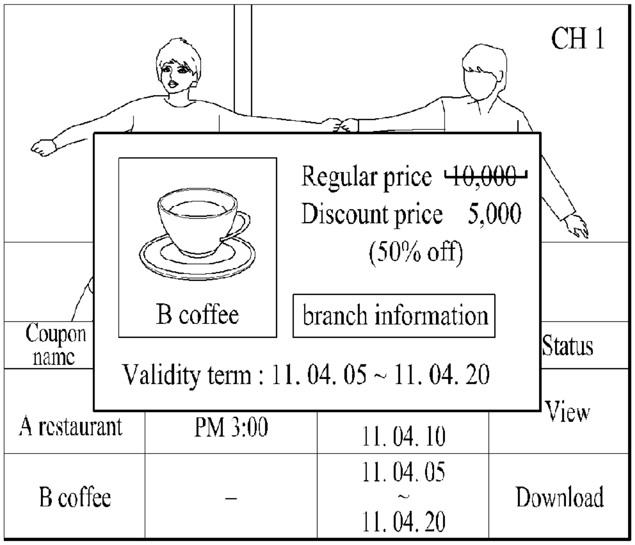

Referring to FIG. 11C, if a prior-to-download coupon information (Status: Download) is selected from the coupon information list shown in FIG. 11A, the mobile terminal 100 may download a corresponding coupon [FIG. 11C (a)] and may then display a coupon image of the downloaded coupon.

For instance, the selection action shown in FIG. 11B or FIG. 11C may be inputted to a status display part of the corresponding coupon information. And, the coupon image shown in FIG. 11B or FIG. 11C may include such a various information (hereinafter named a coupon related information) related to a corresponding coupon as a corresponding coupon usable business enterprise image, a corresponding coupon usable website address or shop address, a corresponding coupon related product/service image, a corresponding coupon bar code image, a corresponding coupon price information/validity term/discount rate and the like. As mentioned in the foregoing description, the coupon related information may be received in the receiving step S650.

If a barcode image of the corresponding coupon is recognized, it may be able to obtain more various kinds of informations related to the corresponding coupon. For instance, such information may include one of advertisement video of product/service related to the corresponding coupon, homage for providing the corresponding coupon and the like.

According to the present invention, in case of receiving a command for switching a broadcast service via the user input unit 130 in the course of a coupon receiving operation through the broadcast service, the mobile terminal 100 may be able to control at least one of the coupon receiving operation and the broadcast service switching operation under the control of the controller 180.

In particular, the broadcast service switching may include a switching between broadcast services belonging to different ensembles [1] or a switching between broadcast services provided on different frequency bands [2]. In this case, assume that the switched broadcast services may differ from each other in a broadcast service (e.g., NRT service by ATSC-MH) for providing a corresponding coupon.

The controller 180 may perform a control operation of switching a broadcast service after completion of the coupon receiving operation [1], a control operation of stopping a coupon receiving operation and switching a broadcast service [2], a control operation of enabling a user to select whether to maintain a coupon receiving operation by performing an indication operation for indicating that a coupon is being received [3], or a control operation of performing a coupon receiving operation using wireless internet after switching a broadcast service [4].

In the following description, the broadcast service switching by ATSC-MH and the corresponding control operations may be further explained in detail.

For clarity and convenience of the following description, assume that a plurality of broadcast services may be included in each of $1^{st}$ and $2^{nd}$ ensembles and that at least one AV broadcast service, at least one NRT service and at least one ESG service may be included in each of the $1^{st}$ and $2^{nd}$ ensembles. Optionally, each of the NRT service and the ESG service may not be provided to each of the ensembles [cf. FIGS. 2A to 2D].

First of all, the mobile terminal 100 may receive an input of a command for switching to a $2^{nd}$ AV broadcast service belonging to a $2^{nd}$ ensemble in the course of an outputting operation of a broadcast program provided by a $1^{st}$ AV broadcast service belonging to a $1^{st}$ ensemble and a coupon receiving operation from a $1^{st}$ NRT service. Of course, a broadcast program output is not mandatory for the embodiment of the present invention. In case of a broadcast program non-outputted state, the mobile terminal 100 may receive an input of an enter command instead of a switching command for switching to the $2^{nd}$ AV broadcast service.

The mobile terminal 100 may perform the following control operations.

First of all, after completion of a coupon receiving operation from the $1^{st}$ NRT service, an output of a broadcast program provided by the $1^{st}$ AV broadcast service may be interrupted. The $1^{st}$ AV broadcast service may be switched to the $2^{nd}$ AV broadcast service. And, a broadcast program provided by the $2^{nd}$ AV broadcast service may be then outputted [1].

Secondly, a coupon receiving operation from the $1^{st}$ NRT service may be interrupted. An output of a broadcast program provided by the $1^{st}$ AV broadcast service may be interrupted. And, a broadcast program provided by the $2^{nd}$ AV broadcast service may be then outputted [2].

Thirdly, before switching to the $2^{nd}$ AV broadcast service, a text indicating that a coupon receiving operation from the $1^{st}$ NRT service is active to lead a user selection [3].

Fourthly, a switching to the $2^{nd}$ AV broadcast service is performed. And, a coupon receiving operation via wireless internet is maintained [4].

This may be described in detail with reference to FIGS. 12A to 12D as follows.

FIGS. 12A to 12D are diagrams of a coupon receiving process and a service switching process in case of receiving an input of a service switching command in the course of a coupon download according to the present invention.

Figure 12A:
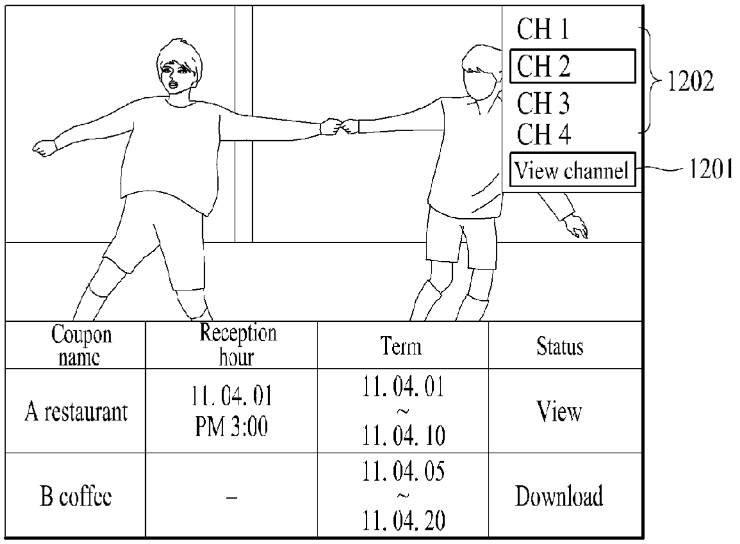
FIGS. 12A to 12D are diagrams of a coupon receiving process and a service switching process in case of receiving an input of a service switching command in the course of a coupon download according to the present invention.
Figure 12A:
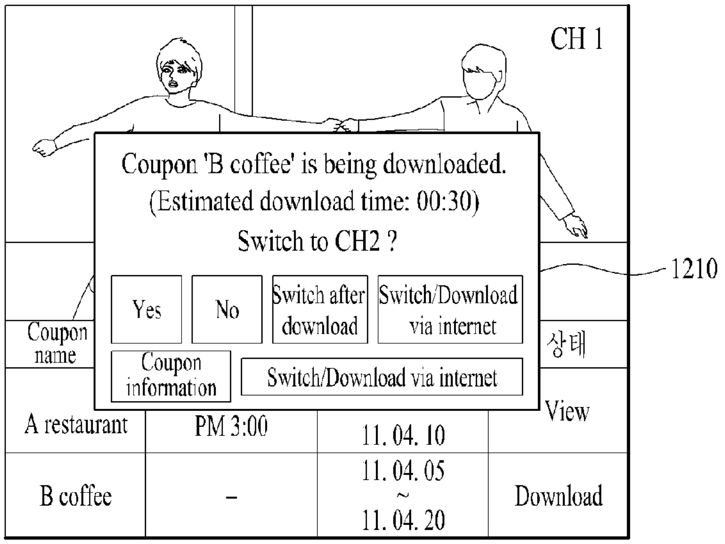

Referring to FIG. 12A, while a broadcast program provided on a $1^{st}$ broadcast service CH1 is being outputted, the mobile terminal 100 may receive an input of a switching command for switching to a $2^{nd}$ broadcast service CH2 from a user [FIG. 12A (a)]. In ding so, assume that the mobile terminal 100 is in progress of a coupon receiving operation. And, assume that the $1^{st}$ broadcast service and the $2^{nd}$ broadcast service may be provided with corresponding coupons via different NRT services, respectively.

As the switching command is inputted, the mobile terminal 100 may output a text indicating that the coupon receiving operation is in progress. And, the mobile terminal 100 may be able to display a window 1210 to enable a user to select a control action related to a coupon receiving operation or a control action related to a broadcast service switching operation [FIG. 12A (b)].

Figure 12B:
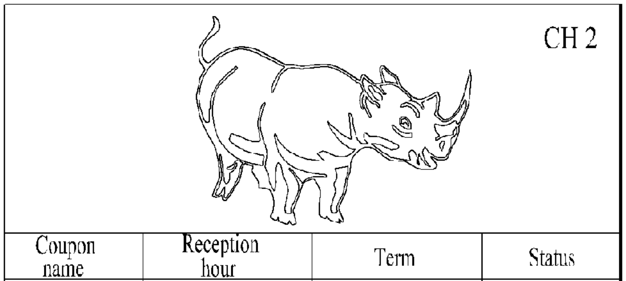

Referring to FIG. 12B, if 'yes' is selected in FIG. 12A (b), the mobile terminal 100 may interrupt the coupon receiving operation, may switch to the $2^{nd}$ broadcast service, and may be then able to output a broadcast program provided from the $2^{nd}$ broadcast service. Moreover, the mobile terminal 100 may be able to display a coupon information list related to the $2^{nd}$ broadcast service. In this case, a coupon information of a download-completed coupon in case of using the $1^{st}$ broadcast service or a coupon information of a non-downloaded coupon in case of using the $1^{st}$ broadcast service may be further included in the coupon information list.

In case of ending the broadcast mode after the switching to the $2^{nd}$ broadcast service or ending the broadcast program currently outputted by the $2^{nd}$ broadcast service, the mobile terminal 100 may be able to resume the interrupted coupon receiving operation by switching to the $1^{st}$ broadcast service automatically or in accordance with a user selection. In case of ending the coupon receiving operation, the mobile terminal 100 may end the broadcast mode or re-switch the $1^{st}$ broadcast service to the $2^{nd}$ broadcast service.

Meanwhile, if 'no' is selected in FIG. 12A (b), the mobile terminal 100 may not perform the switching to the $2^{nd}$ broadcast service.

Figure 12C:
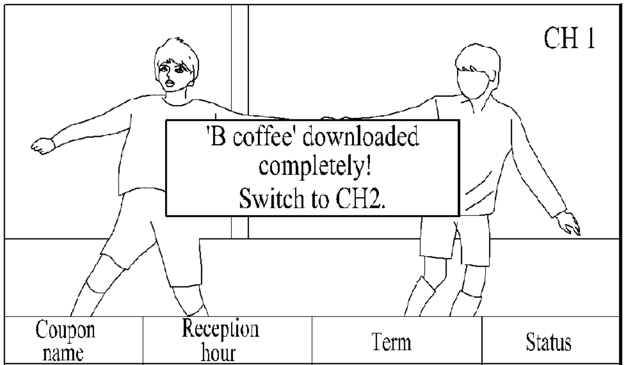

Referring to FIG. 12C, if 'switch after download' is selected in FIG. 12A (b), the mobile terminal 100 may switch to the $2^{nd}$ broadcast service after completion of the coupon receiving operation and may be then able to output a broadcast program provided by the $2^{nd}$ broadcast service. Moreover, the mobile terminal 100 may display a coupon information list related to the $2^{nd}$ broadcast service. Furthermore, coupon informations completely downloaded in using the $1^{st}$ broadcast service may be further included in the coupon information list. Meanwhile, the broadcast program provided by the $1^{st}$ broadcast service may not be outputted until switching to the $2^{nd}$ broadcast service after the input of the switching command.

Figure 12D:
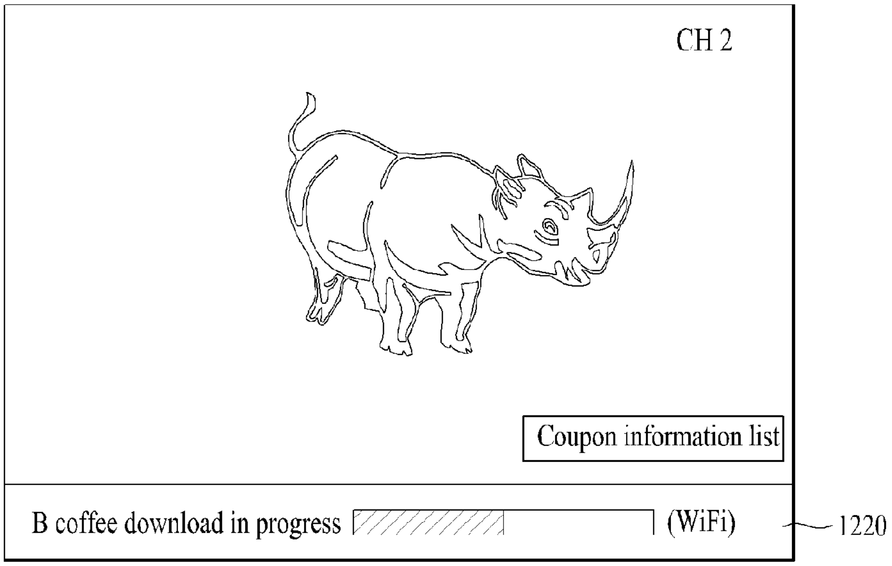

Referring to FIG. 12D, if 'switch/download via internet' is selected in FIG. 12A (b), the mobile terminal 100 may output a broadcast program provided by the $2^{nd}$ broadcast service by switching to the $2^{nd}$ broadcast service, ma interrupt the coupon receiving operation used to be performed in association with the $1^{st}$ broadcast service, and may be then able to resume the interrupted coupon receiving operation via the wireless internet. In doing so, since web address information for providing the corresponding coupon may be contained in the coupon information, the mobile terminal 100 may download the corresponding coupon by accessing a website corresponding to the web address information. Moreover, the mobile terminal 100 may be able to display a progress extent and process 1220 of the coupon receiving operation via the wireless internet on the screen.

According to the present invention, in case of recording a specific broadcast program, under the control of the controller 180, the mobile terminal 100 may save the coupon information together with the specific broadcast program during the recording in the memory 160 [1] or may save coupon information extracted for the recording in the memory 160 [2]. In this case, the coupon information may include the coupon information related to the specific broadcast program or may not be related to the specific broadcast program. In case of receiving an input of a recording command for recording the specific broadcast program from a user, the mobile terminal 100 may perform a recording of the specific broadcast program and a saving of the corresponding coupon information.

Optionally, a saving command for the coupon information may be separately inputted to the mobile terminal 100.

In case of playing the recorded specific broadcast program, under the control of the controller 180, the mobile terminal 100 may be able to display a coupon information list of the coupon information saved together with the specific broadcast program while playing the recorded specific broadcast program. For instance, an output screen of the specific broadcast program may be displayed one region of the screen while the coupon information list may be displayed on another region of the screen. In case of receiving an input of a play command for playing the specific broadcast program from a user, the mobile terminal 100 may be able to perform a playback of the specific broadcast program and a display of the coupon information list. Optionally, the display command for displaying the coupon information list may be separately inputted.

This may be described in detail with reference to FIG. 13A and FIG. 13B as follows.

Figure 13A:
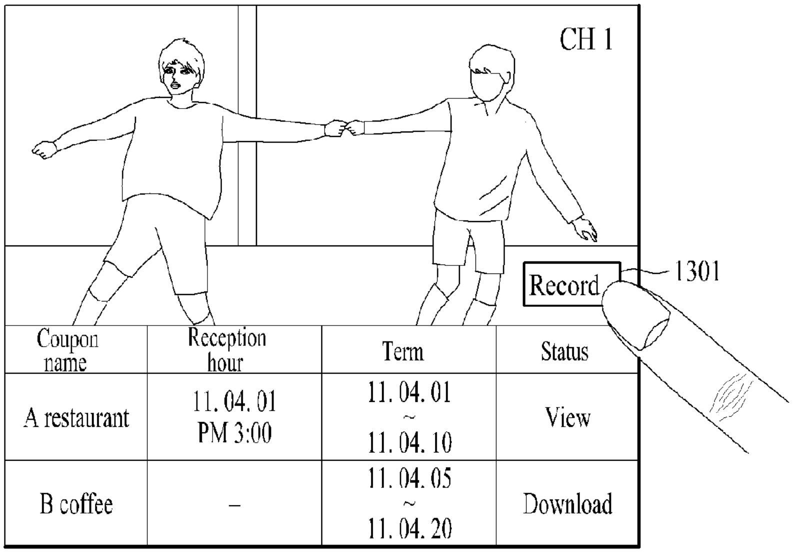
FIG. 13A and FIG. 13B are diagrams for saving and displaying coupon information related to a case of recording/playing a broadcast program according to the present invention.
Figure 13A:
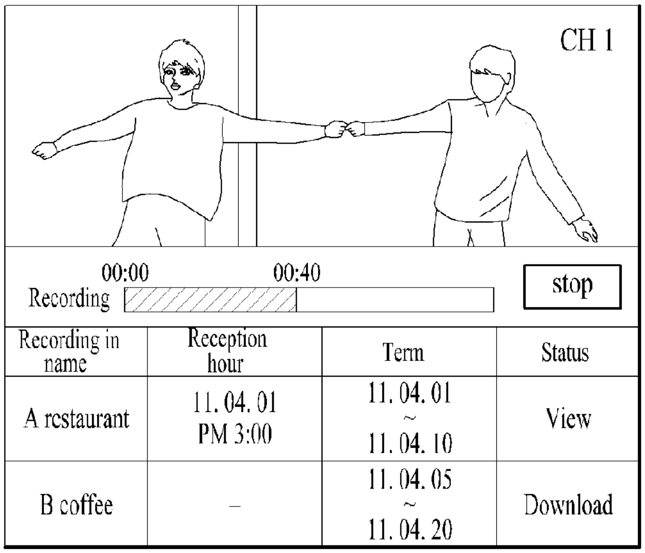
Figure 13B:
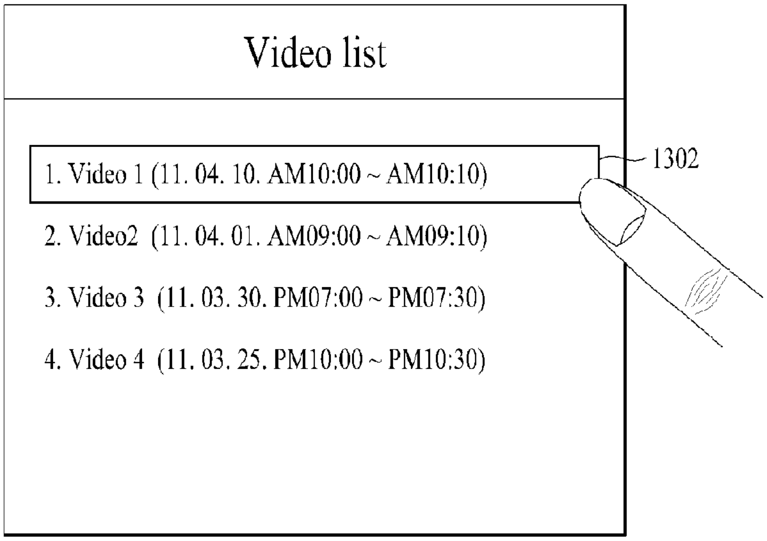
Figure 13B:
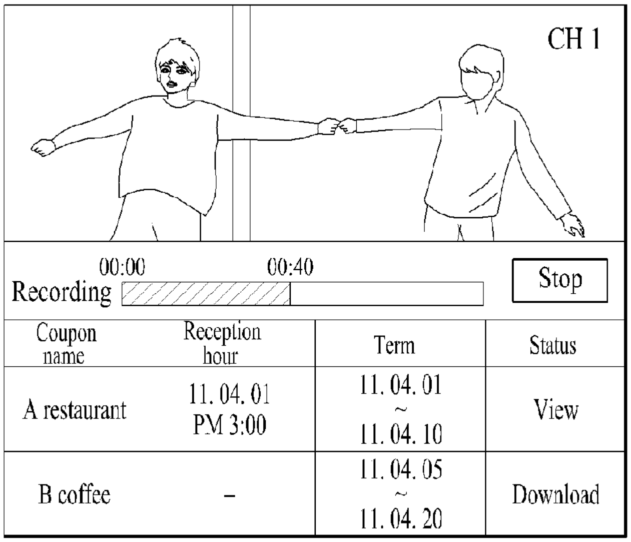

FIG. 13A and FIG. 13B are diagrams for saving and displaying coupon information related to a case of recording/playing a broadcast program according to the present invention.

Referring to FIG. 13A, the mobile terminal may display a coupon information list in the course of outputting a specific broadcast program [FIG. 13A (a)]. In case of receiving an input of a recording command from a user [e.g., by a touch action on a key region 'record' 1301], the mobile terminal 100 may save a coupon information list itself or coupon information configuring the coupon information list displayed together with the specific broadcast program while recording the specific broadcast program [FIG. 13A (b)].

Referring to FIG. 13B, in case of receiving a selection of an item 1302 of a specific broadcast program from a list containing items of the recorded broadcast programs [FIG. 13B (a)], the mobile terminal 100 may display save coupon information saved together with the specific broadcast program or a coupon information list including the coupon information saved together while recording the specific broadcast program [FIG. 13B (b)].

According to the present invention, under the control of the controller 180, the mobile terminal may be able to output indication information on a coupon, of which validity term or downloadable term expires within a predetermined term, using the output unit 150. This may not require an active broadcast mode or an output of a broadcast program but may be applicable to an active state of another application irrespective of a standby mode or a broadcast mode.

This may be described in detail with reference to FIG. 14A and FIG. 14B as follows.

Figure 14A:
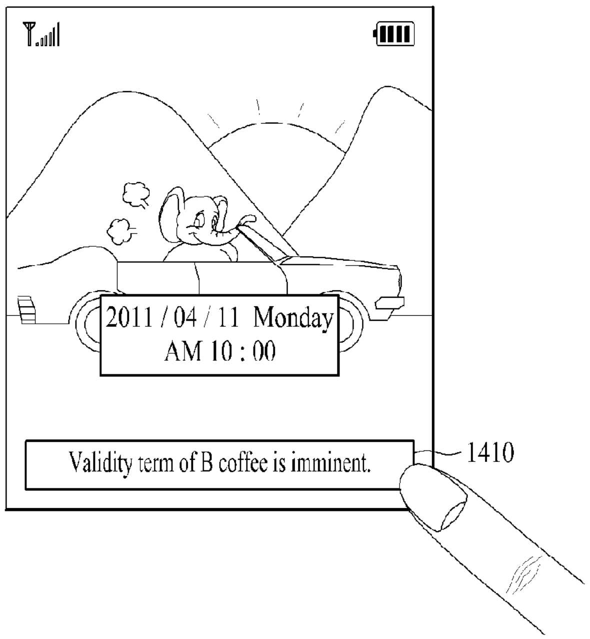
FIG. 14A and FIG. 14B are diagrams for outputting a coupon indication information according to the present invention.
Figure 14B:
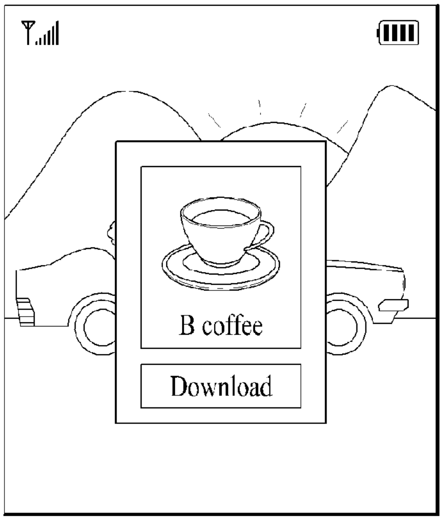
Figure 14B:
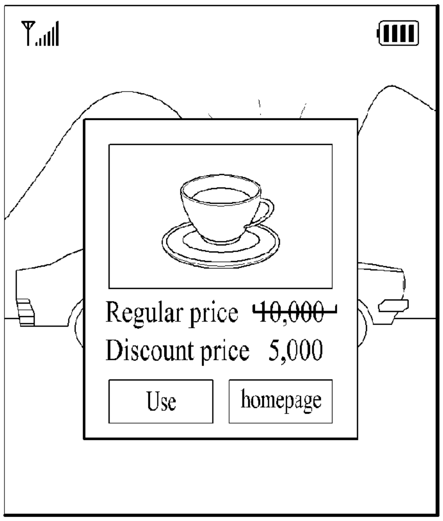

FIG. 14A and FIG. 14B are diagrams for outputting a coupon indication information according to the present invention.

Referring to FIG. 14*a*, in a standby mode or a home screen display mode, if there is a coupon having an imminent validity term or an imminent downloadable term (e.g., a coupon having a validity term expiring today, a coupon having a downloadable term expiring after 1 hour later, etc.), the mobile terminal 100 may be able to output an information 1410 indicating a presence of the corresponding coupon.

Referring to FIG. 14*b*, in case of receiving an input of a command for viewing a coupon or coupon information corresponding to the information 1410 shown in FIG. 14A from a user (e.g., a touch action on the information 1410), if the corresponding coupon is not downloaded yet, the mobile terminal 100 may display a coupon information (including a zone 'download' for receiving an input of a download command) [FIG. 14B (a)]. If the corresponding coupon is downloaded, the mobile terminal 100 may be then able to display the corresponding coupon image [FIG. 14B (b)].

Meanwhile, a coupon or a coupon information, which may become a target of a coupon indication information output, may be designated by a user or the controller 180. And a timing point or cycle of the indication may be designated by the user or the controller 180.

According to the present invention, under the control of the controller 180, the mobile terminal 100 may be able to transmit specific coupon information selected from a coupon information list or a specific coupon corresponding to the specific coupon information to a counterpart terminal using the wireless communication unit 110. Having received the specific coupon information or the specific coupon, the counterpart terminal may be able to use a specific coupon corresponding to the specific coupon information or the received specific coupon. This may be more useful in case that the counterpart terminal is a terminal incapable of broadcast reception.

This may be described in detail with reference to FIG. 15A and FIG. 15B as follows.

Figure 15A:
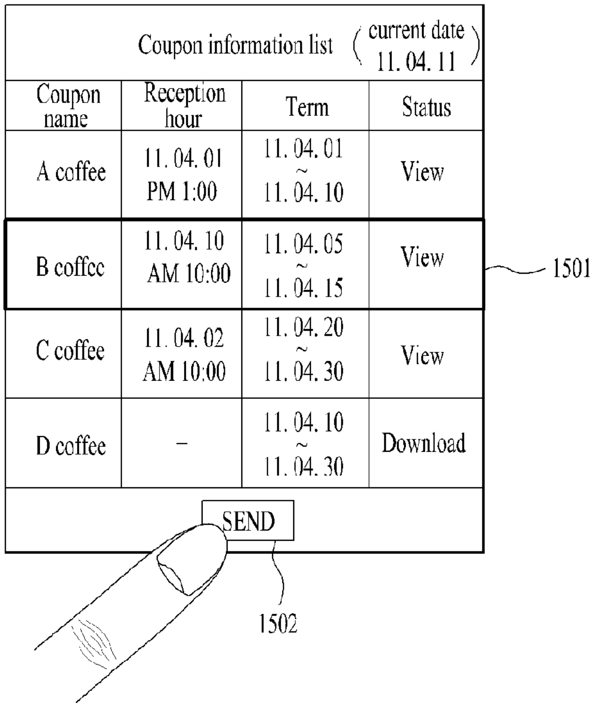
FIG. 15A and FIG. 15B are diagrams of a process for transmitting a specific coupon information or a specific coupon according to the present invention.
Figure 15B:
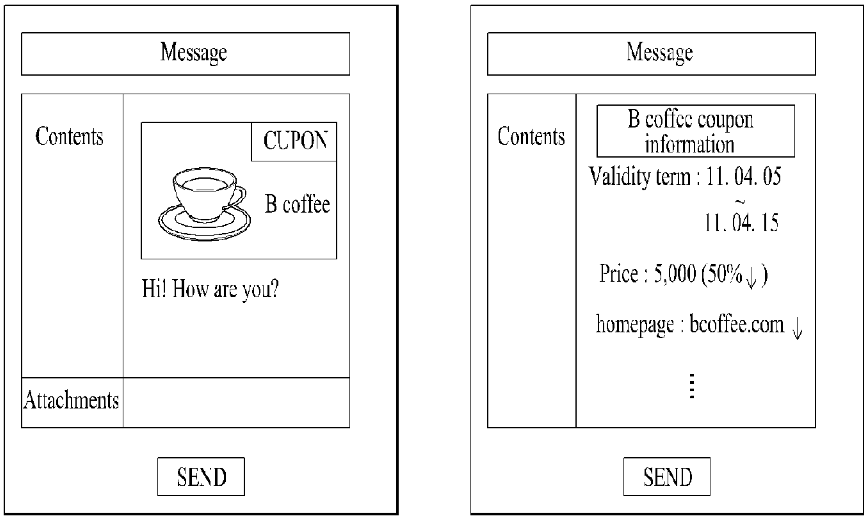

FIG. 15A and FIG. 15B are diagrams of a process for transmitting a specific coupon information or a specific coupon according to the present invention.

Referring to FIG. 15A, the mobile terminal 100 may receive an input of a selection action (e.g., a touch action on the specific coupon information 1501) on a specific coupon information 1501 contained in a coupon information list and an input of a send command action (e.g., a touch action on a key zone 'SEND' 1502). In dong so, assume that a coupon corresponding to the specific coupon information 1501 was previously download.

Referring to FIG. 15B, the mobile terminal 100 may send a message containing the coupon corresponding to the specific coupon information 1501 to a counterpart terminal [FIG. 15B (a)] or may send a message containing the specific coupon information 1501 to the counterpart terminal [FIG. 15B (b)]. In the former case, it may not be necessary for the counterpart terminal to receive the coupon corresponding to the specific coupon information 1501 separately. In the latter case, it may be necessary for the counterpart terminal to download the corresponding coupon using the specific coupon information 1501.

According to one embodiment of the present invention, the above-described coupon managing method can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

Accordingly, the present invention provides the following effects and/or advantages.

First of all, the present invention may receive coupon informations using broadcast related information and may receive a specific coupon corresponding to a specific coupon information among the received coupon informations using a broadcast service. Therefore, it may be unnecessary to allocate a separate radio resource for transmission/reception of coupon information and coupon.

Secondly, the present invention receives a coupon corresponding to a coupon information selected from a coupon information list only, thereby reducing load for a coupon reception.

Thirdly, the present invention may enable a specific coupon to be downloadable only during a broadcast time of a currently broadcast program or a usable time of a broadcast service for providing the currently outputted broadcast program, thereby enabling a user to be led to a coupon download as well as a broadcast viewing.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit;
a display unit;
a controller configured to:
control the wireless communication unit to receive a broadcast service;
extract coupon information from the received broadcast service;
control the display unit to display a map;
control the display unit to display a plurality of coupon identifiers on the map, wherein each coupon identifier of the plurality of coupon identifiers relates to a coupon included in the extracted coupon information, wherein a displayed location of each of the plurality of coupon identifiers corresponds to a location on the map at which an associated coupon is available for redemption;
control the display unit to display a coupon information list in response to an input received while the plurality of coupon identifiers are displayed on the map, wherein the coupon information list identifies coupons respectively associated with each of the plurality of coupon identifiers, and provides a distance from a current location of the mobile terminal to a real location where a coupon of each of the plurality of coupon identifiers is available for redemption;
control the display unit to display detailed coupon information of a selected coupon of the coupon information list, wherein the detailed coupon information comprises product information and a call menu item, wherein input received with regard to the call menu item causes initiation of a call from the mobile terminal to a business associated with the selected coupon;
control the wireless communication unit to receive any selected coupon of the coupon information list in response to an input received with regard to the coupon information list;
control the display unit to terminate displaying of the plurality of coupon identifiers on the map and to terminate displaying of the coupon information list; and
control the display to display a notification on a home screen, wherein the notification is displayed according to an expiration threshold and indicates that a coupon associated with one of the plurality of coupon identifiers will be expiring.

2. The mobile terminal of claim 1, wherein the coupon information comprises at least providing business enterprise information, providing website information, validity term information, downloadable term information, area information, category information, price information, discount rate information, related broadcast program information or related broadcast service information.

3. The mobile terminal of claim 1, further comprising:
a position information unit configured to obtain a current location of the mobile terminal,
wherein the extracted coupon information further corresponds to the obtained current location.

4. The mobile terminal of claim 1, wherein the extracted coupon information comprises at least a validity term, a downloadable term, presently downloadable or usable status, or a discount rate.

5. The mobile terminal of claim 1, wherein the controller is further configured to control a coupon receiving operation or broadcast service switching operation when a command is received for switching the broadcast service, the command received during receipt of the coupon.

6. The mobile terminal of claim 5, wherein the controlling the coupon receiving operation or broadcast service switching operation comprises at least switching the broadcast service after completion of the coupon receiving operation, switching the broadcast service by interrupting the coupon receiving operation, enabling selection of whether to maintain the coupon receiving operation by indicating that a coupon is being received, or switching the broadcast service and then performing the coupon receiving operation via wireless internet.

7. The mobile terminal of claim 5, wherein the broadcast service switching operation includes switching between broadcast services included in different ensembles or switching between broadcast services provided on different frequency bands.

8. The mobile terminal of claim 1, wherein the controller is further configured to control the display unit to display at least an image of a received coupon, a code image, a related product/service image or a related business enterprise image.

9. The mobile terminal of claim 1, further comprising:
a memory configured to store and record information:
record the received broadcast service under the control of the controller; and
store the extracted coupon information together with the recorded broadcast program,
wherein the controller is further configured to control the display unit to display the stored coupon information together with the recorded broadcast program when playing the recorded broadcast program.

10. The mobile terminal of claim 1, wherein the broadcast service is structured as a file delivery over unidirectional transport (FLUTE) electronic service guide (ESG) comprising the coupon information that includes a name of a service providing corresponding coupon information associated with a corresponding A/V service, service identification, corresponding service type, service reference linked with the service identification, name of the corresponding coupon, preview data reference of the corresponding coupon, and location information within non real time (NRT) data to permitting downloading to the mobile terminal the corresponding coupon.

11. A method for receiving coupons performed in a mobile terminal, the method comprising:
receiving a broadcast service;
extracting coupon information from the received broadcast service;
displaying a map;
displaying a plurality of coupon identifiers on the map, wherein each coupon identifier of the plurality of coupon identifiers relates to a coupon included in the extracted coupon information, wherein a displayed location of each of the plurality of coupon identifiers corresponds to a location on the map at which an associated coupon is available for redemption;

displaying a coupon information list in response to an input received while the plurality of coupon identifiers are displayed on the map, wherein the coupon information list identifies coupons respectively associated with each of the plurality of coupon identifiers, and provides a distance from a current location of the mobile terminal to a real location where a coupon of each of the plurality of coupon identifiers is available for redemption;

displaying detailed coupon information of a selected coupon of the coupon information list, wherein the detailed coupon information comprises product information and a call menu item, wherein input received with regard to the call menu item causes initiation of a call from the mobile terminal to a business associated with the selected coupon;

receiving any selected coupon of the coupon information list in response to an input received with regard to the coupon information list;

terminating the displaying of the plurality of coupon identifiers on the map and the displaying of the coupon information list; and displaying a notification on a home screen, wherein the notification is displayed according to an expiration threshold and indicates that a coupon associated with one of the plurality of coupon identifiers will be expiring.

12. The method of claim 11, wherein the broadcast service is structured as a file delivery over unidirectional transport (FLUTE) electronic service guide (ESG) comprising the coupon information that includes a name of a service providing corresponding coupon information associated with a corresponding A/V service, service identification, corresponding service type, service reference linked with the service identification, name of the corresponding coupon, preview data reference of the corresponding coupon, and location information within non real time (NRT) data to permitting downloading to the mobile terminal the corresponding coupon.

* * * * *